US011865677B2

(12) United States Patent
MacDonald

(10) Patent No.: US 11,865,677 B2
(45) Date of Patent: Jan. 9, 2024

(54) RATCHETING WRENCHES, WRENCH SYSTEMS, SOCKETS, AND METHODS OF USE

(71) Applicant: Jeffrey Dean MacDonald, Victoria (CA)

(72) Inventor: Jeffrey Dean MacDonald, Victoria (CA)

( * ) Notice: Subject to any disclaimer, the term of this patent is extended or adjusted under 35 U.S.C. 154(b) by 688 days.

(21) Appl. No.: 16/389,991

(22) Filed: Apr. 21, 2019

(65) Prior Publication Data

US 2019/0321946 A1 Oct. 24, 2019

Related U.S. Application Data

(60) Provisional application No. 62/661,002, filed on Apr. 21, 2018, provisional application No. 62/682,168, filed on Jun. 7, 2018, provisional application No. 62/727,536, filed on Sep. 5, 2018.

(51) Int. Cl.

| | |
|---|---|
| ***B25B 13/46*** | (2006.01) |
| ***B25B 23/16*** | (2006.01) |
| ***B25B 23/00*** | (2006.01) |
| ***B25G 1/04*** | (2006.01) |

(52) U.S. Cl.

CPC ........ *B25B 13/463* (2013.01); *B25B 23/0007* (2013.01); *B25B 23/16* (2013.01); *B25G 1/043* (2013.01)

(58) Field of Classification Search

CPC ... B25B 13/463; B25B 23/0007; B25B 23/16; B25G 1/043

USPC .......................................................... 81/58.2

See application file for complete search history.

(56) References Cited

U.S. PATENT DOCUMENTS 38,914 A * 6/1863 Richardson ........... B25B 13/463 81/185
614,255 A * 11/1898 McChesney ............ B25B 13/28 81/177.2
1,157,427 A * 10/1915 Seivert .................. B25B 13/463 81/60
1,314,044 A * 8/1919 Buker ................... B25B 13/102 269/283

(Continued)

*Primary Examiner* — Hadi Shakeri

(74) *Attorney, Agent, or Firm* — Law Office of Michael Antone; Michael Antone

(57) ABSTRACT

Various wrenches, wrench systems, and methods of the present invention include inner and outer mouths that provide increased strength and utility. The inner mouth may be configured with an open or a closed end to receive removable open or closed end gears and perform ratcheting action when the gear seated in the inner mouth and engaged and a rotational force is applied to the gear via the wrench. The outer mouth may prevent the gear from disengaging from the inner mouth when the inner mouth is installed in the outer mouth and provide structural strength to the inner mouth when force is applied to the gear via the wrench. Various embodiments include a handle and a head, where the head includes a fixed jaw and a movable jaw, or belt, forming a mouth configured to receive removable open or closed end gears and perform ratcheting action when a fitting is engaged by the gear positioned in the mouth and rotational force is applied to the fitting via the gear and the wrench. The present invention may include two or more stackable sockets to vary the effective length of the socket.

8 Claims, 20 Drawing Sheets

(56) References Cited

U.S. PATENT DOCUMENTS

| | | | | |
|---|---|---|---|---|
| 2,551,669 | A * | 5/1951 | Hale | B25B 13/463 81/58.2 |
| 2,909,954 | A * | 10/1959 | Rhoads | B25B 13/08 81/186 |
| 3,732,756 | A | 5/1973 | Thomasian | |
| 4,123,953 | A * | 11/1978 | Corbacho, Jr. | B25G 1/125 81/60 |
| 4,631,990 | A | 12/1986 | Hughes | |
| 4,811,637 | A * | 3/1989 | McCleary | B25B 23/16 81/177.2 |
| 5,471,899 | A | 12/1995 | Twomlow | |
| 6,044,944 | A | 4/2000 | Adams | |
| 6,378,400 | B1 | 4/2002 | Bogli | |
| 7,121,172 | B1 | 10/2006 | Daniels | |
| 8,100,036 | B2 | 1/2012 | Huang | |
| 8,459,152 | B2 * | 6/2013 | Keong | B25B 13/08 81/119 |
| 8,904,907 | B2 | 12/2014 | Douglass | |
| 8,950,293 | B2 | 2/2015 | Hu | |
| 9,358,678 | B2 | 6/2016 | Lai | |
| 9,616,555 | B2 | 4/2017 | Chartier | |
| 9,975,223 | B2 * | 5/2018 | Chen | B25B 13/463 |
| 2006/0137492 | A1 * | 6/2006 | Melos | B25B 13/463 81/62 |
| 2011/0138972 | A1 | 6/2011 | Wojick | |
| 2014/0096652 | A1 | 4/2014 | Hu | |
| 2016/0193721 | A1 | 7/2016 | Douglass | |
| 2016/0288312 | A1 | 10/2016 | Tian | |
| 2017/0072543 | A1 | 3/2017 | Taylor | |

* cited by examiner

FIG. 2A
FIG. 2B
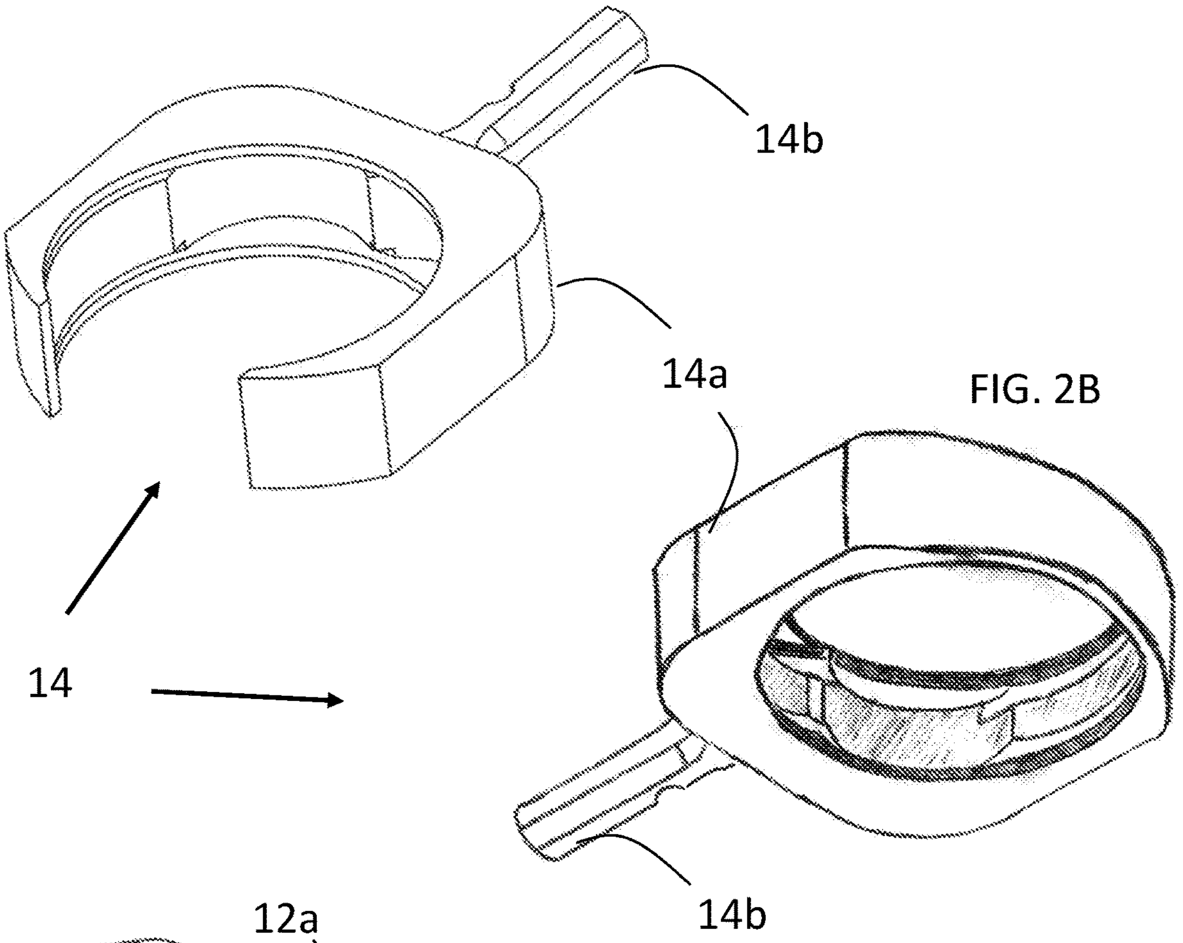
FIG. 3
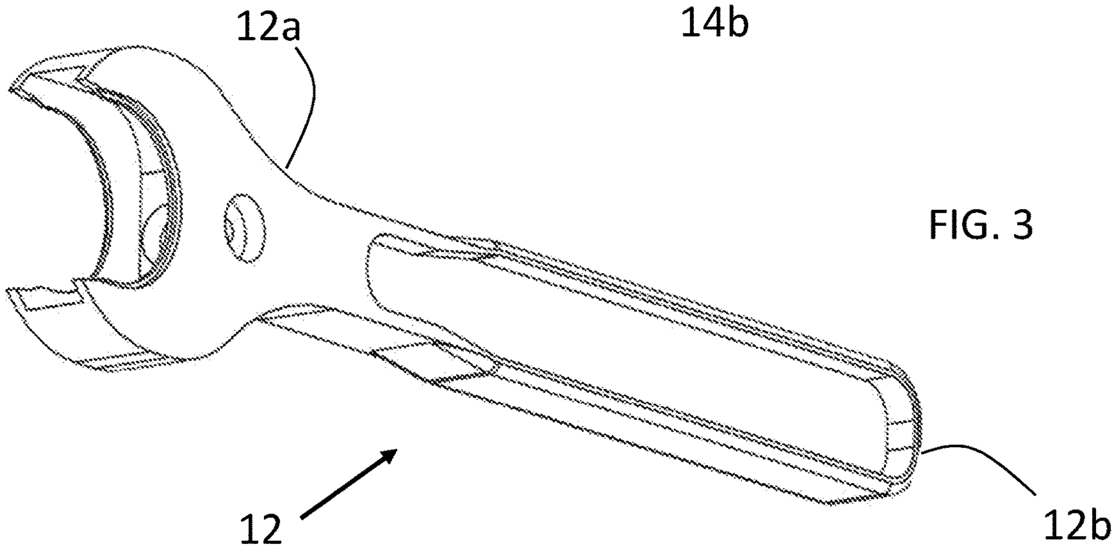

FIG. 5A
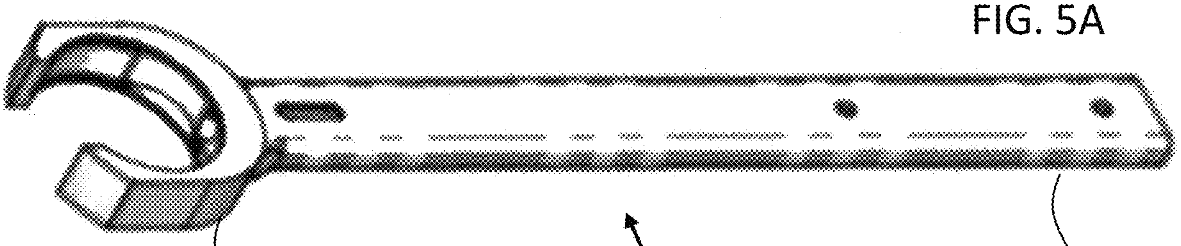
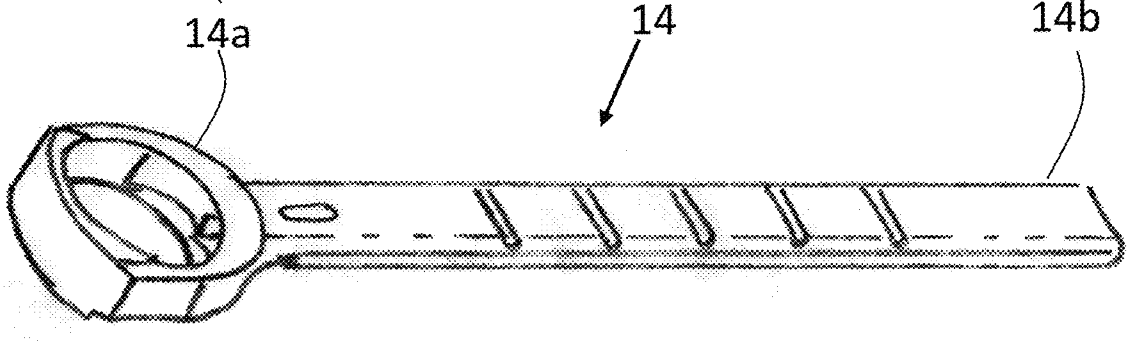
FIG. 5B
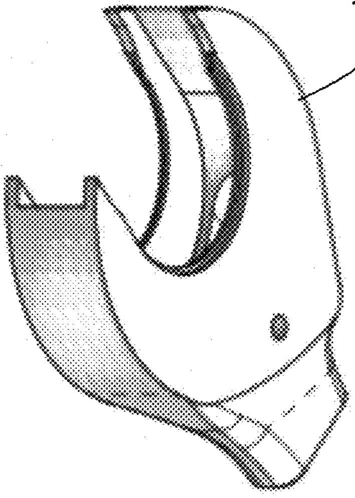
FIG. 6A
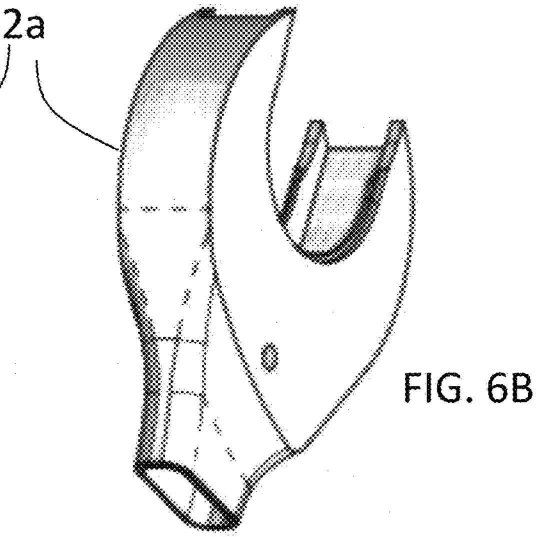
FIG. 6B
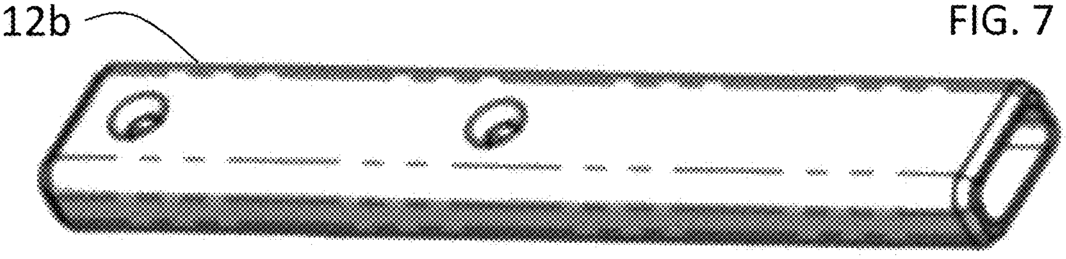
FIG. 7

14b
14
14a 16
14a 14a
14
14b

FIG. 22
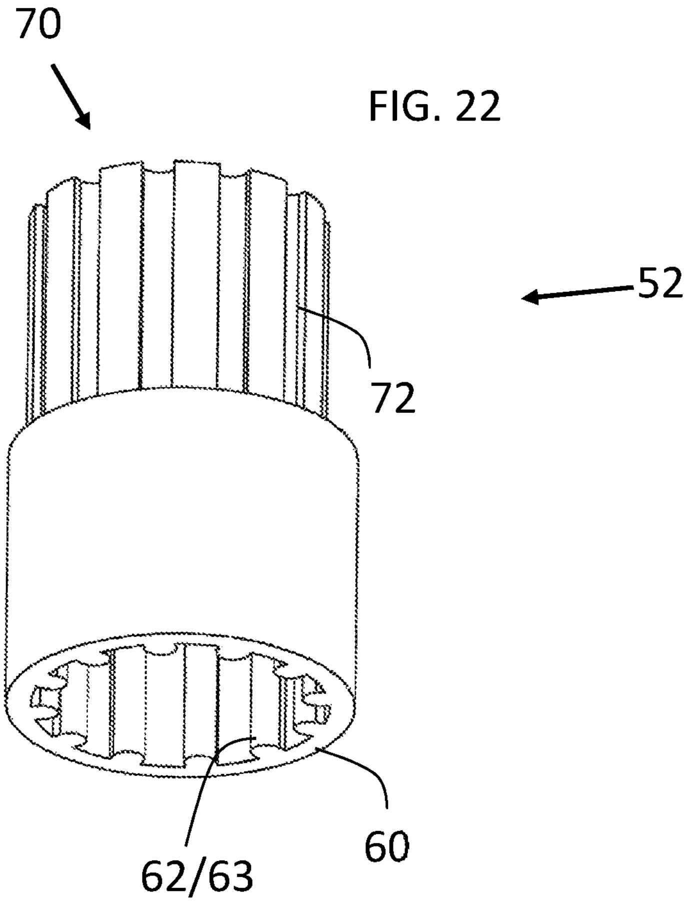
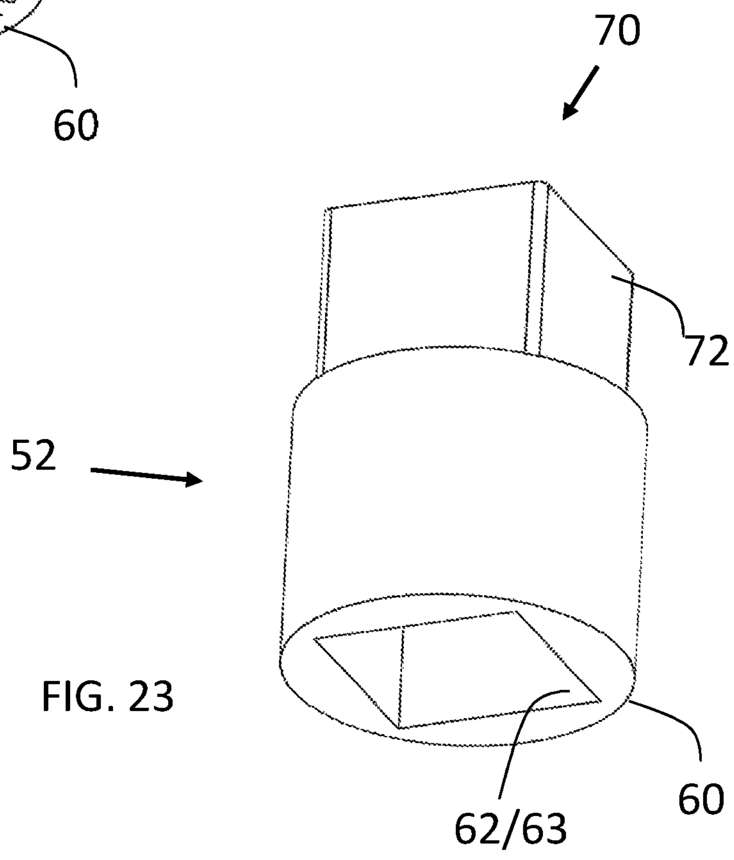
FIG. 23

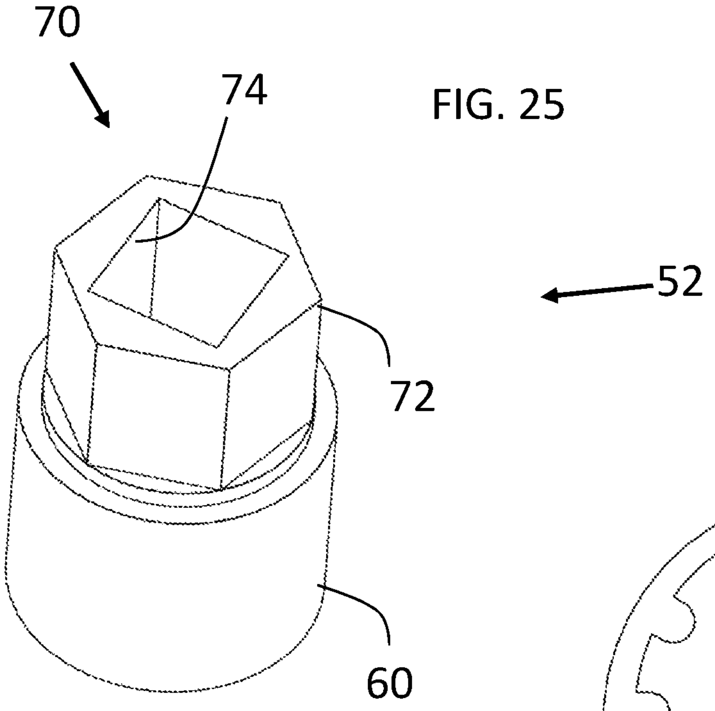
FIG. 25
FIG. 26
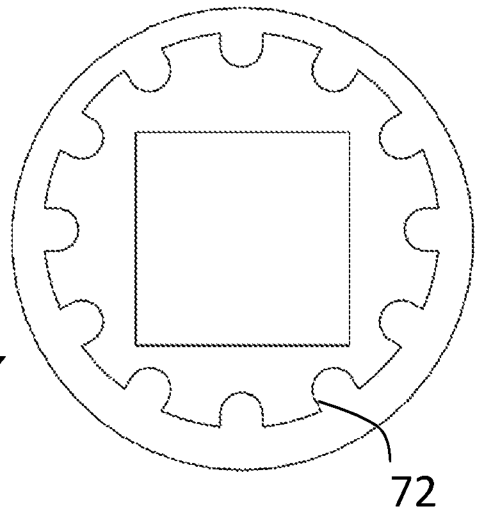
FIG. 27
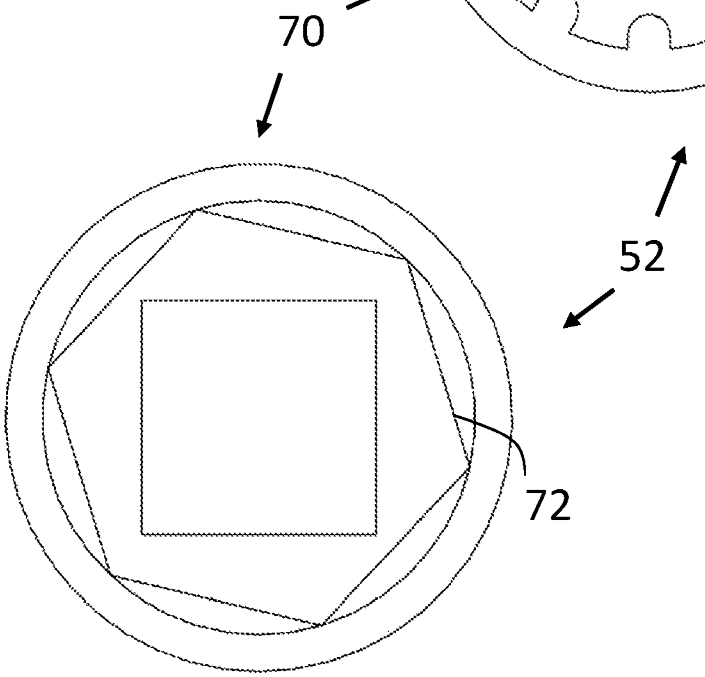

RATCHETING WRENCHES, WRENCH SYSTEMS, SOCKETS, AND METHODS OF USE

CROSS-REFERENCE TO RELATED APPLICATIONS

This non-provisional patent application claims the benefit of and priority to U.S. Provisional Patent Application Nos. 62/661,002 filed 2018 Apr. 21, 62/682,168 filed 2018 Jun. 07, and 62/727,536 filed 2018 Sep. 05, which are incorporated herein by reference in their entireties.

BACKGROUND OF THE INVENTION

Field of the Invention

The present disclosure relates to ratchet wrenches. More particularly the present disclosure relates to ratchet wrenches and sockets with improved performance and/or utility.

Background Art

Ratchet wrenches have ratcheting, or ratchet, mechanisms that allow the wrenches to transmit force/torque in one direction to a fitting, such as a nut, screw, or a bolt, yet allows free rotation of the handle in the other direction while the wrench head remains in communication with the fitting. The ratcheting function is particularly useful for applications in which fittings that need to be tightened or loosened are not freely accessible to allow full or significant rotation of a non-ratcheting wrench.

Closed ended ratchet wrenches are well known, but are limited to applications with non-line fittings. Conversely, International Patent Application No. PCT/CA2014/000423, published Nov. 7, 2013 to MacDonald and entitled "OPEN-ENDED RATCHET WRENCH", discloses open-ended ratchet wrench systems that can be used in a wide variety of applications, which is incorporated herein by reference in its entirety.

Despite the many advances in wrench and other tool technology, there is a continuing need for wrenches, sockets, and other tools with improved performance.

BRIEF SUMMARY OF THE INVENTION

Accordingly, the present invention includes various wrenches, wrench systems and methods to that end. In various embodiments, the wrench includes an inner and outer mouths. The inner mouth may be configured with an open or a closed end to receive removable open or closed end gears and perform ratcheting action when a fitting is engaged by the gear seated in the inner mouth and rotational force is applied to the fitting via the gear and ratchet mechanism in the wrench. The outer mouth may be configured to prevent the gear from disengaging from the inner mouth, when the inner mouth is installed in the outer mouth and to provide structural strength to the wrench when force is applied to the gear via the wrench.

In various embodiments, the outer mouth may partially or completely envelope the inner mouth. The envelopment may be symmetric or asymmetric between the front and back and left and right sides of the wrench. In various embodiments, the outer mouth may be configured to be the primary or secondary retention mechanism for the gear seated in the inner mouth to prevent unseating of the gear in the axis perpendicular to the plane of the rotation of the wrench.

In various embodiments, the wrench may be symmetric from front to back and left to right. In other embodiments, the wrench may be asymmetric left to right and/or front to back to provide additional strength in one direction relative to the other direction. The asymmetry may be implemented in the inner and/or outer mouth. For example, the inner mouth may be symmetric with the head, or gear, end and configured to receive the gear from either the front or the back, and the outer mouth may be configured asymmetrically to provide additional strength when rotating the wrench in one direction. The front to back asymmetry may also include the wrench head and handle not being in the same plane.

In various embodiments, the inner mouth may be connected integrally or with fasteners to a stem, shank, or handle portion. For example, the inner mouth and handle portion may provide a functional wrench without the outer mouth of the wrench or may have to be installed in the outer mouth portion to provide a functional wrench.

The inner mouth may be configured to retain the gear with or without the outer mouth. The gears may be generally inserted into the inner mouth from the direction perpendicular to the rotational plane of the wrench. In various embodiments, the inner mouth may be opened in the plane of rotation of the wrench to enable gears to be inserted in the plane of rotation. In this manner, the inner mouth may retain the gear from movement in either direction perpendicular to the rotational plane.

The inner mouth may include a jaw including a ratchet mechanism to engage a gear inserted into the inner mouth and to provide ratcheting action in operation, when force is applied to the wrench in the rotational plane. The ratchet mechanisms may be configured to provide ratcheting in one rotational direction only or switchable for ratcheting operation in both rotational directions. For example, in symmetric wrench embodiments, ratcheting may be provided in one direction only and the wrench flipped over to provide ratcheting action in the other rotational direction. Whereas, for asymmetric wrenches, it may be desirable to provide ratcheting in both directions.

The outer mouth may be a stand-alone head, or may be connected integrally or with fasteners to various stem, shank, or handle portions. The outer mouth head may be one solid unit or include 2 or more portions that are fastened around the inner mouth. In various embodiments, the outer mouth may be integrally or separately connected with an outer handle, which may form the operative portion of the wrench where force is applied. In these embodiments, the inner mouth is inserted from the head end of the outer body and fastened into place with at least a portion of the inner body extending into the handle portion of the outer body. The handle portion of the outer body may be in part or entirely solid material or tubular in nature to allow the inner body be inserted and to provide telescoping functionality to various designs.

In still other embodiments, the inner and outer mouths may be asymmetric, either in or out of the rotational plane. The outer mouth front or back portions may cooperate with inner mouth back or front portions to provide increased strength.

In various embodiments, the gear may be inserted into the inner mouth, which may be then inserted into the outer mouth and secured to configure the wrench for use. Securing of the inner mouth portion in the outer mouth may be performed in any number of manners and combinations in the practice of the invention.

In various embodiments, the wrenches include a handle and a head, where the head includes a fixed jaw and a movable jaw, or belt, forming a mouth configured to receive removable open or closed end gears and perform ratcheting action when a fitting is engaged by the gear positioned in the mouth and rotational force is applied to the fitting via the gear and the wrench.

The belt may be biased to partially or completely close the mouth to retain the gear with or without latching to the fixed jaw. Also, the belt may close in various manners to retain a gear in the mouth with or without one or more retaining lips being provided on the gear. In this manner, various wrench embodiments may be used with standard, e.g., commercial on the shelf, sockets such as those used with standard ratchet sets.

In various embodiments, the wrench may include one or more pivots between the head and handle portions to enable force to be applied via the handle in a plane that is different from a rotational plane of the gear positioned in the head and being rotated to apply rotational force, or torque, to a fitting engaged by the gear.

The belt and/or the fixed jaw may include one or more ratcheting mechanisms, such as pawls, teeth, rollers, etc. that may be used to engage various toothed and toothless gears, or sockets, in various open and closed ended wrench applications. For example, the one or more interchangeable gears may be a line wrench sprocket wrench head, a line wrench socket wrench head, an open-sided sprocket wrench head, an open-sided socket wrench head, a box-end sprocket wrench head, a pass-through socket wrench head, a driver-bit wrench head, a screwdriver wrench head or a universal socket adapter wrench head.

The present invention may be used with various toothed and toothless gears, or sockets, in various open and closed ended wrench applications. For example, the one or more interchangeable gears may be a line wrench sprocket wrench head, a line wrench socket wrench head, an open-sided sprocket wrench head, an open-sided socket wrench head, a box-end sprocket wrench head, a pass-through socket wrench head, a driver-bit wrench head, a screwdriver wrench head or a universal socket adapter wrench head.

The present invention further provides stackable socket and socket driver systems that include interchangeable sockets that may be used to directly apply force to a fitting and be stacked to vary the effective depth of the sockets, thereby increasing the number of applications addressable with the sockets of the inventive system. Unlike various stackable sockets of the prior art, sockets of the present invention may be used not only with other sockets in the system of the present invention, but with standard and customary sockets and wrenches, thereby expanding the uses of existing socket systems. Sockets of the present invention may be used with open ended and closed ended force applicators, or socket drivers, such as wrenches, drills, etc.

Sockets may be generally tubular in shape having an inner diameter sized to receive a fitting and associated bolt extending through fitting. The socket may have a first, or female, end for force application to the fitting, in which the inner surface of the first end of the socket is sized and shaped to fit a size and shape of a first fitting, e.g., hex, 12 point, spline, etc. The socket may have a second, or male, end with an outer surface sized and shaped for force application to the socket that is translated via the socket through the first end to the fitting engaged by the socket. The outer surface of the second end may be sized and shaped to fit a size and shape of a second fitting, which may or may not be the same as the fitting.

In various embodiments, the socket system may include one or more sets of one or more first sockets having first ends with the inner surface having different sizes and shapes corresponding to a range of fitting sizes and shapes. The second end of the first sockets may have the outer surface sized and shaped to the same size and shape fitting, which may be called the first set, second end dimensions. The system may further include one or more sets of one or more second sockets, typically of varying depth. The first end inner surface and second end outer surface of the second sockets are sized and shaped, such that the first end inner surface of the second sockets may engage and cooperate with the second end outer surface dimensions of both the first and second sockets. The second sockets may also be used individually, or in combination, to apply force to fittings having the same size and shape as outer surface, second end dimensions. The second sockets may also be used individually, or in combination, with first sockets to extend the depth of the first set sockets by engaging the second end of one of the first sockets with the first end of one of the second sockets. The effective depth of the first and second sockets may be further extended by stacking one or more additional second sockets on the second end of the second socket used to engage the first socket or the fitting. Linear and/or rotational force is then applied to the second end of the top second set socket using the socket drive.

It will be appreciated that additional pairs of sets analogous to the first and second sockets may be employed to provide a range of sizes and shapes for various fittings. For example, pairs of socket sets may be sized and shaped for different ranges of English or metric system fittings, such as the first set having first ends sized to engage ¼ inch to 1 inch hex fittings with second ends with a 1 inch hex shaped and a depth of 1 inch with the second set including sockets having the first and second ends sized at 1 inch hex, but various depths. The skilled artisan may be able to envision an incredibly large number of pairs of first and second sets of sockets spanning a wide or narrow range of size and shapes.

In operation, a user may have two or more inventive sockets at their disposal. The user may select a first socket having a first end sized and shaped to fit a first fitting. The user may then select a second socket having a first end sized and shaped to fit the second end of the first socket, stack the first and second sockets by engaging the second end of the first socket with the first end of the second socket, thereby effectively extending the depth of the socket. The user may then stack additional sockets on the second socket or may apply force to the second end of the socket with a force applicator, e.g., wrench, that may be sized and shaped to fit the second end of the second socket.

In various embodiments, standard or custom sockets that do not have first and second ends as described with respect to the first and second set sockets may be used in the present invention. For example, the top socket in the stack, i.e., the socket in the stack of sockets furthest from the fitting being engaged, may be a standard socket with a first end sized and shaped to the first set, second end dimensions, and the second end having a size and shape adapted to be engaged by various force applicators, such as wrenches, drills, etc.

It will be appreciated that one or more other sets of sockets including one or more other sockets may be provided that have first and second ends that differ from the sockets in the first and second set of sockets. For example, various individual sockets may have first and second sizes and shapes that do not correspond to first and second set sockets, such as a socket having a first end with a hex shaped inner surface and a second end with a spline outer surface. These individual sockets may be used as adaptors to enable stacking with first and second set sockets. In addition, these individual sockets may be used as adapters to adapt a second end of prior art standard and custom sockets to sizes and shapes compatible with sockets of the present invention.

As may be disclosed, taught, and/or suggested herein to the skilled artisan, the present invention addresses the continuing need for wrenches with improved performance and utility.

BRIEF DESCRIPTION OF THE DRAWINGS

The accompanying drawings are included for the purpose of exemplary illustration of various aspects of the present invention to aid in description, and not for purposes of limiting the invention, wherein:

FIGS. 2A & 2B illustrate various exemplary inner mouth wrench embodiments with an open-end (2A) and closed-end (2B).

FIG. 3 illustrates outer body embodiments with integral outer mouth and handle.

FIGS. 5A & 5B illustrate various exemplary inner mouth wrench embodiments with an open-end (5A) and closed-end (5B).

FIGS. 6A & 6B illustrate two perspective views of various exemplary outer mouth embodiments.

FIG. 7 illustrates separate outer handle embodiments.

FIGS. 20-15 illustrates various perspective views of exemplary socket embodiments.

FIGS. 26-27 illustrates various top plan views of exemplary socket embodiments.

Figure 1A:
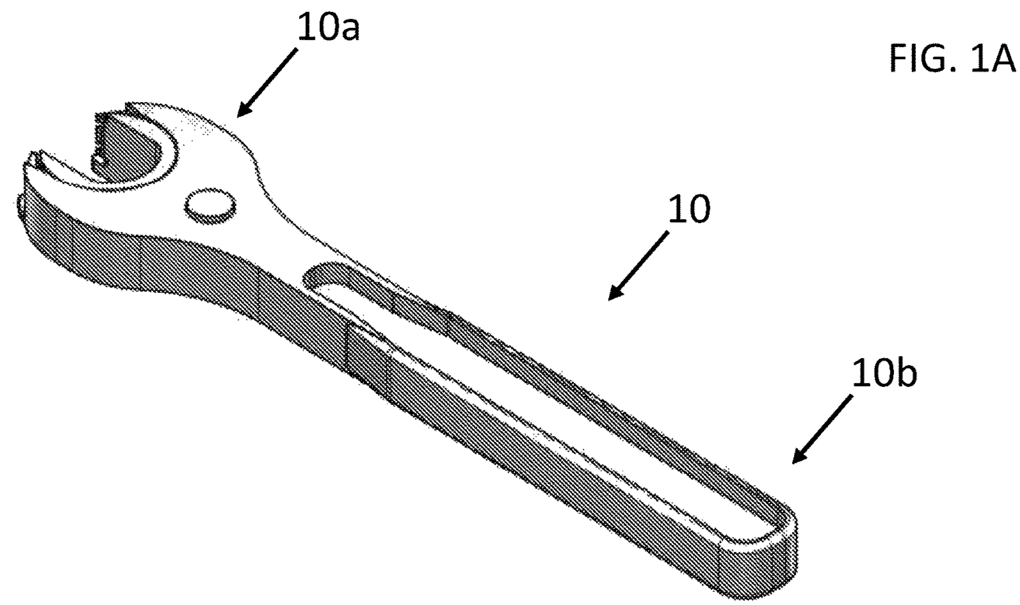
FIGS. 1A & 1B illustrate various exemplary wrench embodiments in assembled and disassembled views, respectively.

In the drawings and detailed description, the same or similar reference numbers may identify the same or similar elements. It will be appreciated that the implementations, features, etc. described with respect to embodiments in specific figures may be implemented with respect to other embodiments in other figures, unless expressly stated, or otherwise not possible.

DETAILED DESCRIPTION OF THE INVENTION

Ratcheting wrenches, wrench systems, and methods of the present invention are described herein, by way of example and otherwise. In various embodiments, a wrench, or wrench system, 10 includes an outer body 12 and inner body 14 having respective outer and inner mouths, 12*a* and 14*a*, and may include outer and inner shanks or handle portions, 12*b* and 14*b*.

The inner mouth 14*a* may be configured with an open or a closed, or box, end to receive one or more removable gears 16 in cooperation with a ratchet mechanism and perform ratcheting action when a fitting is engaged by the gear seated in the inner mouth 14*a* and rotational force is applied to the fitting via the wrench 10. The outer mouth 12*a* may be configured to prevent the gear 16 from disengaging from the inner mouth 14*a* during operation, when the inner mouth 14*a* is installed in the outer mouth 12*a*. The inner body 12 may be secured within the outer body 14 by various fasteners, as are known to those of skill in the art.

Figure 1B:
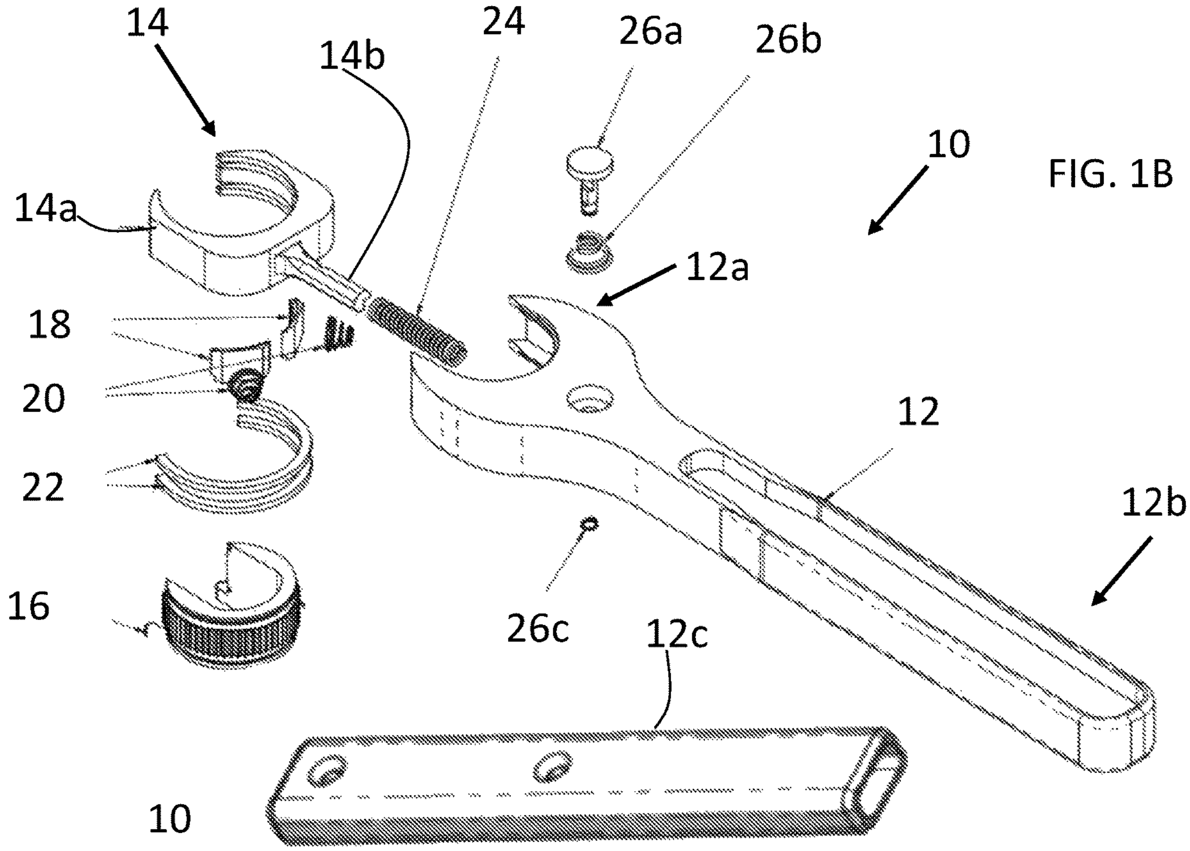

FIGS. 1A and 1B illustrate assembled and disassembled views of exemplary wrench 10 embodiments including a head, or gear, end 10*a* and a handle end 10*b*.

As illustrated in FIG. 1B, exemplary wrenches 10 includes the outer body 12 including the outer mouth 12*a* and handle portion 12*b*. The inner body 14 includes the inner mouth 14*a* and the handle portion 14*b*.

FIGS. 2A and 2B illustrates exemplary inner body 14 embodiments. FIG. 2A illustrates various open ended mouth embodiments. FIG. 2B illustrates various closed ended, box, mouth embodiments. FIG. 3 illustrates various outer body embodiments.

In various embodiments, the outer body 12 has a large open-ended mouth 12*a* to hold, stabilize, and provide strength to inner mouth 14*a*, which prevents spreading of the inner mouth 14*a*, when force is applied to the fitting via the gear 16 installed in the inner mouth 14*a*. If extra reach or torque is desired, a handle sleeve 12*c* may be provided on the outer body handle 12*b* and used to adjust the length of the outer body 12.

The inner mouth 14*a* may employ a ratchet mechanism that includes one or more pawls 18, which may be biased with tapered springs 20 on opposing sides of the inner mouth 14*a*. Retaining rings 22 may be used to retain the pawls 18 and tapered springs 20 in the inner mouth 14*a*.

In various embodiments, inner body 14 may be spring-loaded into the outer body 12. For example, spring 24 may be used to bias the inner body 14 with the outer body 12 and held in place using, for example, a button retention assembly 26*a-c*, which pushes the inner body 14 out of the outer body 12 when button 26*a* is depressed. In other embodiments, the inner mouth 14*a* may be snapped into or clamped by the outer mouth or secured by various other methods as is known in the art.

The inner mouth 14*a* may be equipped with teeth for engaging with teeth around perimeter of the gear 16 as it wraps around gear holding it in place and cooperating to transmit force to the gear 16. However, it may be appreciated that the ratchet mechanism and the gear 16 may or may not employ teeth to cooperate depending upon the ratchet mechanism employed. When not secure in the outer body 12, the inner mouth 14*a* may be extended away from the outer body to receive the gear 16. After the gear 16 is installed in the inner mouth 14*a*, the inner body 14 may be re-seated inside the outer body 12 and secured for operation.

FIG. 1A and other wrench embodiments may be used with a variety of gear types, such as ratcheting open-end, ratcheting flare nut, ratcheting 6-point box-end, ratcheting 12-point box-end, ratcheting spline, conventional socket adapter, pass-thru socket.

As will be further described with respect to other exemplary embodiments herein, the wrenches 10 may include a wide range of embodiments and variations.

In various embodiments, the wrench 10 may be symmetric from front to back and left to right. In other embodiments, the wrench 10 may be asymmetric left to right and/or front to back to provide additional strength in one direction relative to the other direction. The asymmetry may also be implemented in the inner mouth 14*a* and/or outer mouth 12*a*. For example, the inner mouth 14*a* may be symmetric with the head, or gear, end configured to receive the gear from either the front or the back, and the outer mouth 12*a* may be configured asymmetrically to provide additional strength when rotating the wrench in one direction. The front to back asymmetry may also include the wrench head and handle not being in the same plane.

In still other embodiments, the inner mouth 14*a* and outer mouth 12*a* may be asymmetric, either in or out of the rotational plane. For example, the outer mouth 12*a* front or back portion may cooperate with inner mouth 14*a* back or front portion to provide increased strength.

In various embodiments, the outer mouth 12*a* may partially or completely envelope the inner mouth 14*a*. The envelopment may be symmetric or asymmetric between the front and back and left and right sides of the wrench 10. In various embodiments, the outer mouth may be configured to be the primary or secondary retention mechanism for the gear 16 seated in the inner mouth 14*a* to prevent unseating of gear 16 in the axis perpendicular to the plane of the rotation of the wrench 10.

In various embodiments, the inner mouth 14*a* may be connected integrally or with fasteners to an inner stem, shank, or handle portion 14*b*. For example, the inner mouth 14*a* and inner handle portion 14*b* may provide a functional wrench without the outer mouth 12*a* of the wrench 10 or may have to be installed in the outer mouth 12*a* to provide a functional wrench, i.e., a wrench that can function to transfer sufficient force via the gear 16 to perform a desired task.

The inner mouth 14*a* may be configured to retain the gear 16 with or without the outer mouth 12*a*. The gears 16 may be generally inserted into the inner mouth from the direction perpendicular to the rotational plane of the wrench 10. In various embodiments, the inner mouth 14*a* may be opened in the plane of rotation of the wrench 10 to enable gears 16 to be inserted in the plane of rotation. In this manner, the inner mouth 12*a* may retain the gear 16 from movement in either direction perpendicular to the rotational plane.

The inner mouth 14*a* may include a jaw with a ratchet, or ratcheting, mechanism, such as one or more pawl mechanisms 18 positioned to engage the gear 16 inserted into the inner mouth 14*a* and provide ratcheting action in operation. The ratchet mechanisms may be configured to provide ratcheting in one rotational direction only or switchable for ratcheting operation in both rotational directions. For example, in symmetric wrench embodiments, ratcheting may only be provided in one rotational direction, perhaps to simplify construction and/or improve durability, and the wrench may be flipped over to provide ratcheting action in the other rotational direction. Whereas, for asymmetric wrenches, it may be desirable to provide ratcheting in both directions. Various ratchet mechanisms are known in the art, see, for example, US Publication No. 20150082949 and U.S. Pat. No. 6,044,944.

The outer body handle 12*b* is shown in these embodiments with a solid perimeter and an open middle portion. However, other handle styles including solid, different open sections or patterns, lengths, thicknesses, etc. may be used within the scope of the present invention.

The outer mouth 12*a* may be a stand-alone head, or may be connected integrally or with fasteners to various outer stem, shank, or handle portions 12*b*. The outer mouth head 12*a* may be one solid unit or include 2 or more portions that are fastened around the inner mouth 14*a*. In various embodiments, the outer mouth 12*a* may be integrally or separately connected with an outer handle, such as via the inner body 14, which may form the operative portion of the wrench where force is applied. In these embodiments, the inner mouth is inserted from the head end of the outer body and fastened into place with at least a portion of the inner body 14 extending into the handle portion 12*b* of the outer body 12. The handle portion 12*b* of the outer body 12 may be in part or entirely solid material or tubular in nature to allow the inner body be inserted and to provide telescoping functionality to various designs.

The outer mouth 12*a* functions to ensure the gear 16 is retained in an operative position with the inner mouth 14*a* and provide strength to wrench 10 to enable increased amounts of torque to the fittings during operation. The precise structural relationship and interaction between the inner mouth 14*a* and the outer mouth 12*a* may be a design choice. For example, when the inner mouth 14*b* snuggly fits into the outer mouth 12*b*, it may not be necessary to provide as much structural strength in the inner mouth 14*a*. One of ordinary skill will appreciate that the design of the inner mouth 14*a* and outer mouth 12*a* may be scaled to provide a wide range of sizes and torque levels.

In various embodiments, the gear 16 may be inserted into the inner mouth 14*a* into a cooperative position with the ratchet mechanism, which may be then inserted into the outer mouth 12 and secured to configure the wrench 10 for use. Securing of the inner body 14 in the outer body 12 may be performed in any number of manners and combinations in the practice of the invention, such as using fasteners.

Figure 4A:
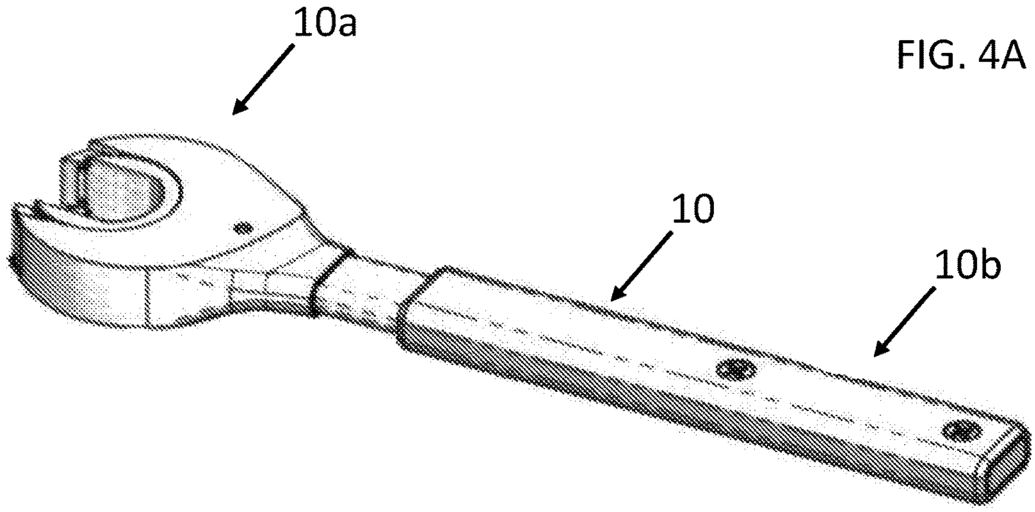
FIGS. 4A & 4B illustrate various exemplary wrench embodiments in assembled and disassembled views, respectively.
Figure 4B:
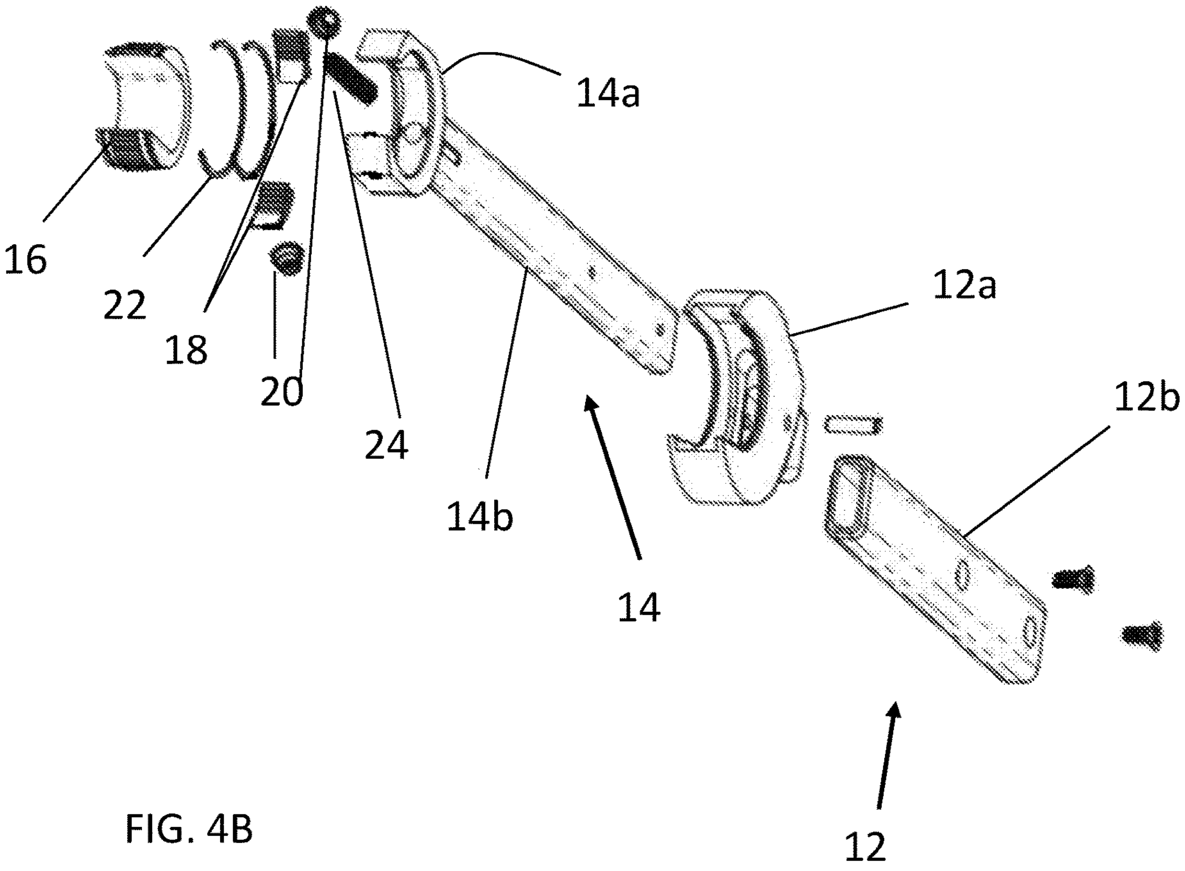

FIGS. 4A and 4B illustrate assembled and disassembled views of further exemplary wrench 10 embodiments of the present invention. The wrenches 10 include a full wrench inner body 14 (FIGS. 5A and 5B) and the outer body 12 may include separate outer head-end 12*a* (FIGS. 6A and 6B) and outer handle end 12*b* (FIG. 7). One of ordinary skill will appreciate that the full wrench inner body 14 of embodiments, such as those illustrated in FIGS. 4A and 4B may be used with full wrench outer body 12 embodiments, such as those illustrated in FIGS. 1A and 1B.

In other embodiments, the outer body 12 may only include a head-end 12*a* and no handle-end 12*b*, such that force is applied to the handle portion 14*b* of the inner body 14. In other embodiments, both the inner body 14 and outer body 12 are full wrench bodies, i.e., a head end connected to a handle end to which force can be applied to tighten or loosen the fitting.

Figures 8A, 8B, 8C, 8D:
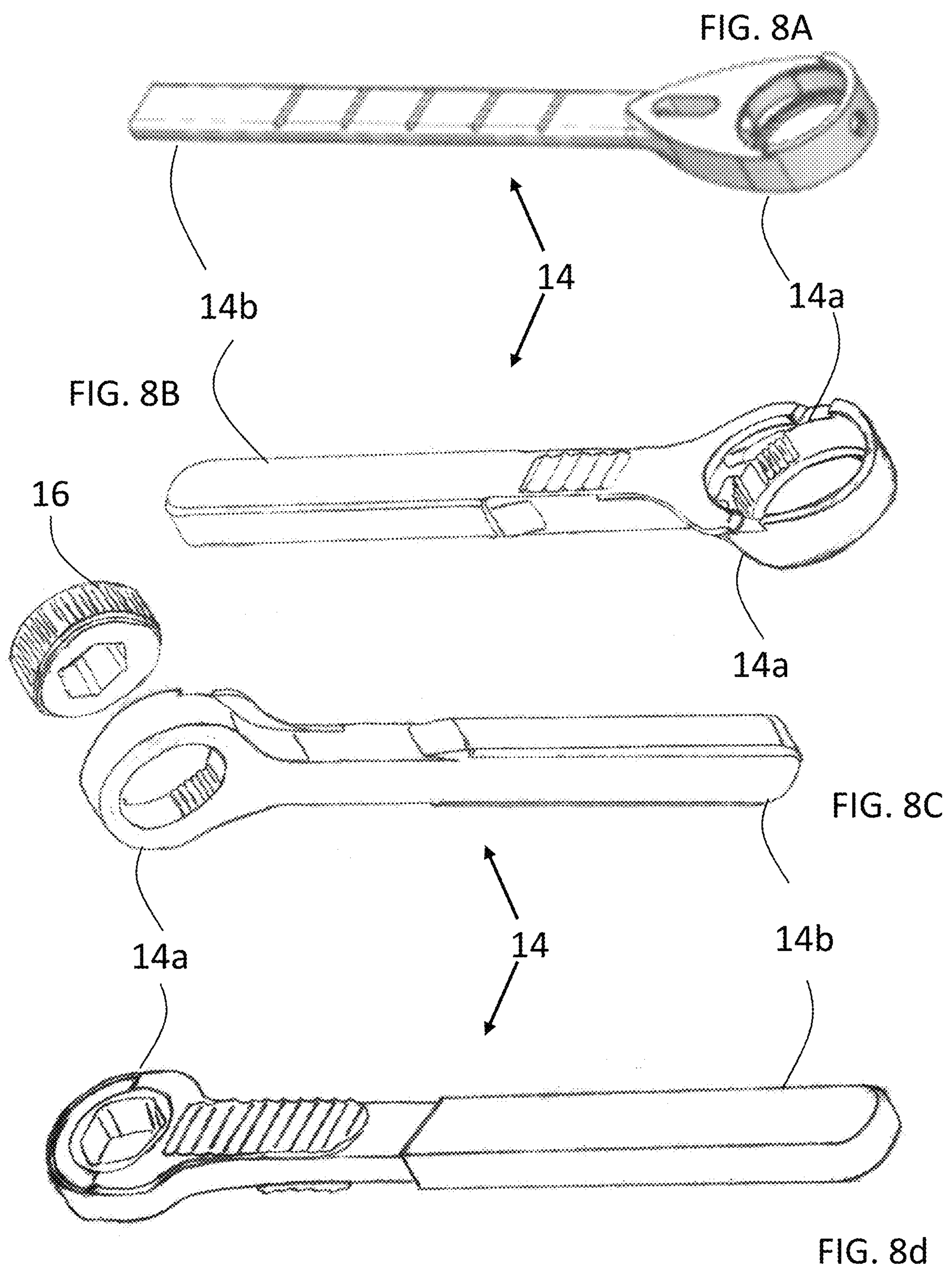
FIGS. 8A-8E illustrate various exemplary closed-end wrench embodiments in assembled (8A-8D) and disassembled views (8E).
Figure 8E:
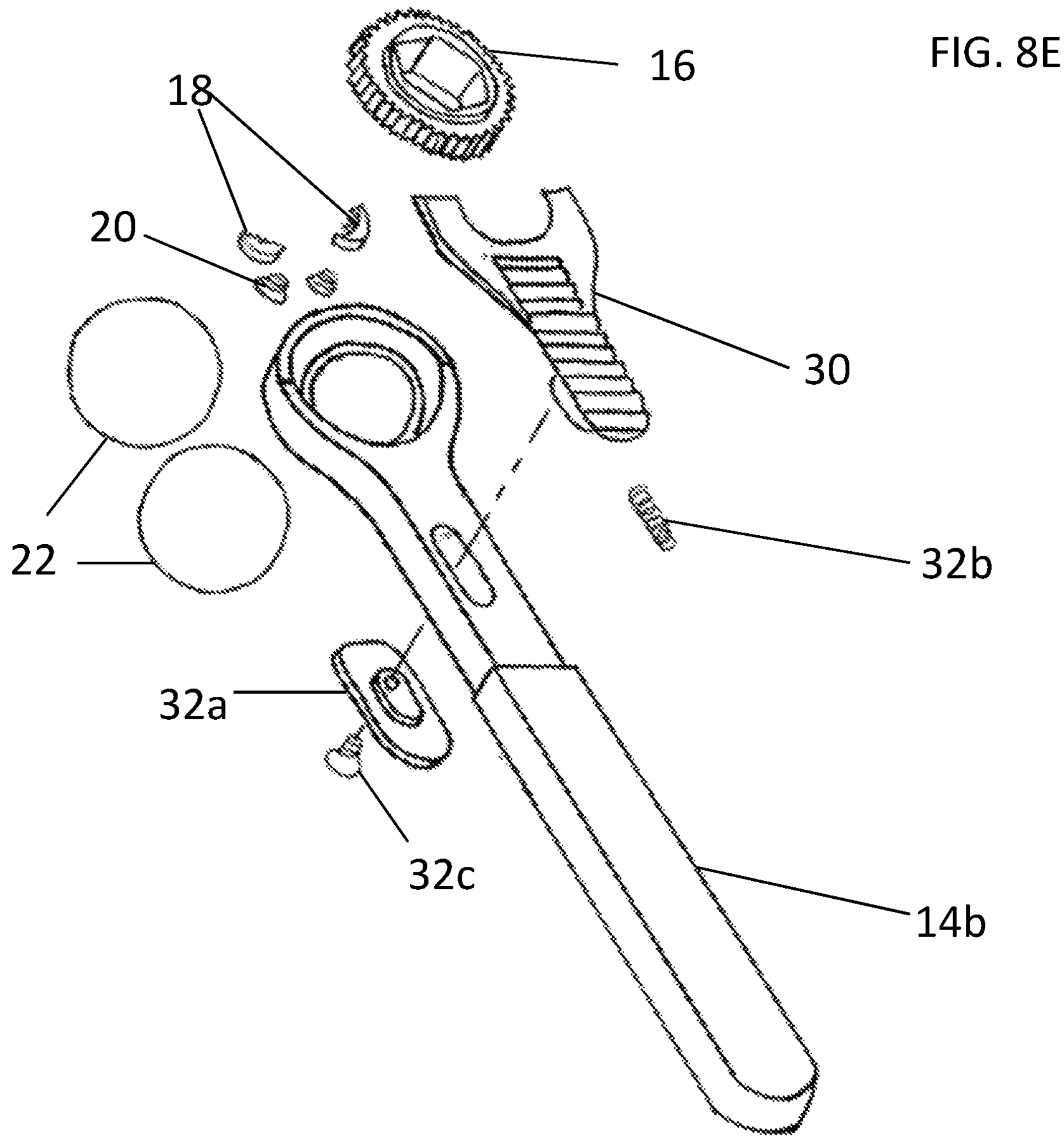

FIGS. 8A-8E illustrate exemplary embodiments of the inner body 14 as a fully functioning box end wrench that may be used with or without the outer body 12. Unlike embodiments that employ the outer mouth 12*a* to secure and retain the gear 16 in the inner mouth 14*a*, these embodiments may employ a separate retention mechanism to enable the use of the inner body 14 without the outer body 12. For example, a cover 30 and locking mechanism, such as a spring-loaded slide lock mechanism 32*a-d* may be employed to allow for gears 16 to be inserted and removed and retained during operation. FIG. 8A illustrates the inner body 14 without a gear installed and the cover closed. FIG. 8B illustrates the inner body 14 without a gear installed and the cover open. FIG. C illustrates the inner body 14 with the cover open and a gear being installed. FIG. 8D illustrates the inner body 14 with a gear installed and the cover closed. FIG. 8E illustrates an exploded view of the inner body 14.

In operation, the gear 16 is selected to perform a desired task. While the gear has been generally described relative to tightening and/or loosening fittings of all sorts, it will be appreciated that the gear 16 may provide other functionality as is commonly found in ratchet and driver sets. Once selected, the gear 16 is seated in the inner mouth 14*a* of the wrench 10. If the inner mouth 14*a* is being deployed as a stand-alone fully functioning wrench, then the gear is engaged by inner body gear retention mechanism, and put into operation. If not being operated in stand-alone mode, the inner body 14 is then inserted into outer mouth 12*a* of the outer body 12, which is then secured in place. The wrench 10 is then used to perform the desired operation.

In various embodiments, wrench, or wrench systems, 30 include a head, or head end/portion, 30*a* and a handle, or handle end/portion, 30*b*. The head end 30*a* includes a fixed jaw 32*a* and a movable jaw, or belt, 32*b* forming a mouth 34 configured to receive a removable open or closed end gear 36 and perform ratcheting action when a fitting is engaged by the gear 36 positioned in the mouth 34 and a rotational force is applied to the fitting via the gear 36 and the wrench 30, typically via the wrench handle 30*b*.

The belt 32*b* may be biased to partially or completely close the mouth 34 to retain the gear 36 with or without latching to the fixed jaw 32*a*. The belt 32*b* may close in various manners to retain the gear 36 in the mouth 34 with or without one or more retaining lips being provided on the gear 36. In this manner, various wrench embodiments may be used with gears 36 that include standard, e.g., commercial on the shelf, sockets such as those used with standard ratchet sets.

Figures 9, 10:
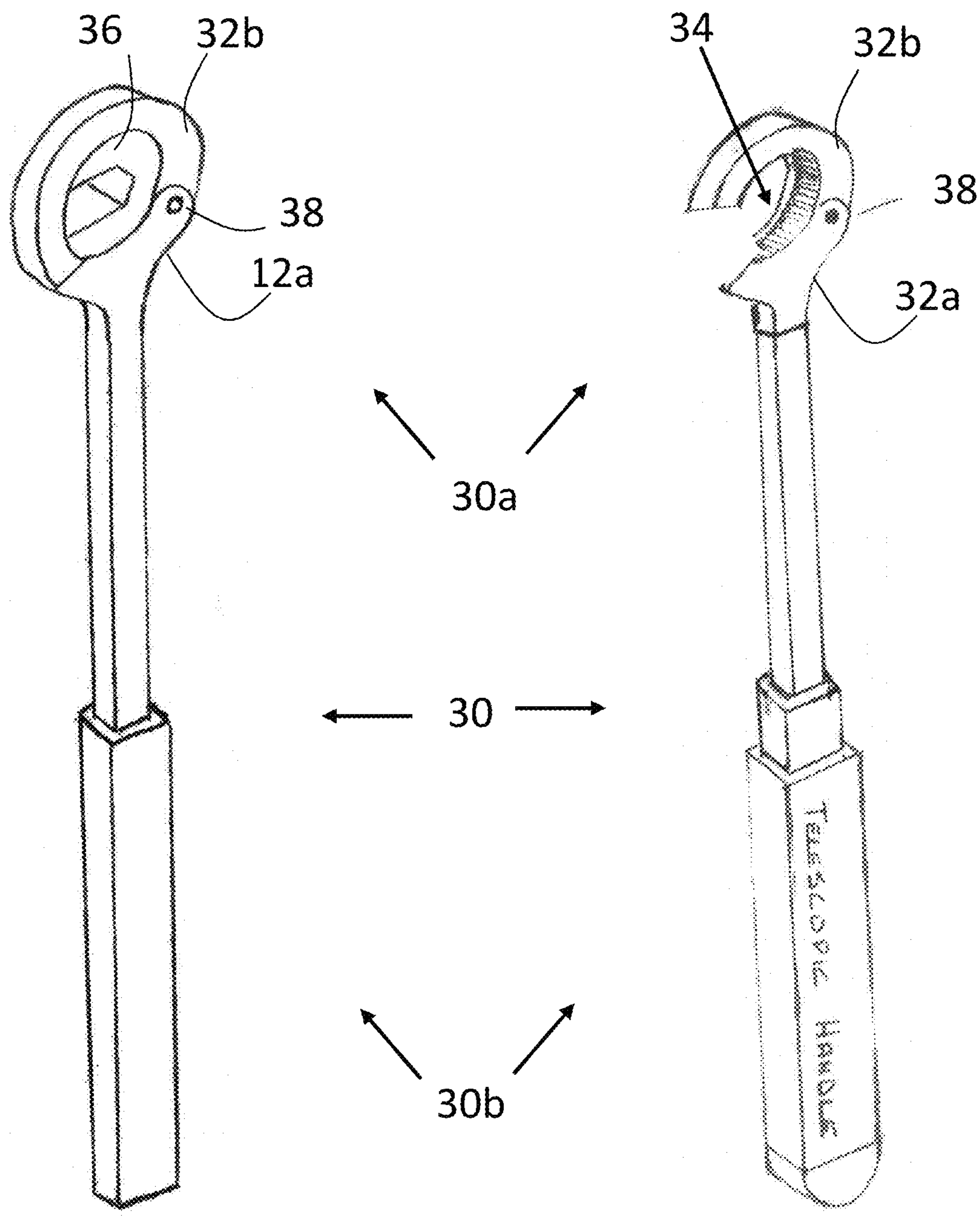
FIGS. 9 & 10 illustrate various exemplary wrench embodiments, respectively.

FIGS. 9 and 10 illustrate various wrench embodiments. In these embodiments a single section belt 32*b* may be connected to the fixed jaw 32*a* via a connector 38 that may allow the belt 32*b* to be moved relative to the fixed jaw 32*a*, i.e., opened and closed, to allow the gear 36 to be inserted or removed from the mouth 34. The insertion and removal of the gear 30 may be performed in or out of the plane of rotation of the wrench 30 when applying force to a fitting engaged by the gear 36 retained in the mouth 34 of the wrench 30.

In embodiments in which the belt 32*b* does not fully wrap around the gear 36 and contact or connect with the fixed jaw 32*a*, such as FIG. 10, it will be appreciated that closed means that belt 32*b* is moved to a position in which the gear 36 is retained in the mouth 34, which is the operable position. Also, the belt 32*b* may be movable to multiple open, non-operable positions, as well as more than one closed, or operable position.

An operable position is when the gear 36 is retained in the mouth 34 of the wrench head 30*a* and force may be applied to the handle 30*b* in a first rotational direction in a rotational plane that is translated through the wrench head 30*a* to the gear 36 retained in the mouth 34. Force may be applied to the handle 30*b* in a second rotational direction in the rotational plane that is translated to the wrench head 30*a*, but is not translated to the gear 36 retained in the mouth 34, thereby allowing the wrench head 30*a* and wrench handle 30*b* to be rotated independently of the gear 36.

When the gear 36 is engaged with a fitting, force applied to the wrench 30 in the first rotational direction will be applied by the gear 36 to the fitting. The gear 36 may remain engaged with the fitting when force is applied to the wrench 30 in the second rotational direction, but the force will not be translated to the gear 36 or fitting.

The connector 38 facilitates the relative movement of the fixed jaw 32*a* and the belt 32*b* to enable the wrench 30 to be moved relative to the gear 36 retained in the mouth 34 in a 1$^{st}$ rotational direction and engagement of the wrench 30 with the gear 36 to apply force to a fitting engaged by the gear 36 when the wrench 30 is rotated in the other, or 2$^{nd}$, rotational direction. For example, rotation of the wrench embodiments shown in FIGS. 9 and 10 in the 1st counter-clockwise direction would allow rotation of the wrench 30 relative to the gear 36, i.e., the "disengaged" rotational direction, while the gear 36 is retained in the mouth 34 and may be engaged with a fitting. Clockwise rotation of the wrench in the 2$^{nd}$ rotational direction, i.e., the "engaged" rotational direction, would engage the gear 36 and apply force to a fitting engaged by the gear 36 as the wrench 30 is rotated.

The connector 38 may provide for free/unrestrained or biased/restrained movement of the belt 32*b* relative to the fixed jaw 32*a*. For example, the connector 38 may be spring loaded to close or partially close the mouth 34. The connector 38 may also be movable between one or more locking settings, or may allow free movement of the belt 32*b*, which may be latched or otherwise connected at a 2$^{nd}$ point to the fixed jaw 32*a* in various embodiments in which the mouth 34 is closed completely during operation.

As shown in FIG. 10, various embodiments of the wrench 30 may include teeth on the fixed jaw 32*a* and/or the belt 32*b* around a portion or all of the mouth 34 for engagement with corresponding teeth of the gear 36 to facilitate ratcheting action. It will be appreciated and further discussed herein that other engagement mechanism for providing ratcheting action may be employed with or without teeth as described herein and known in the art. FIG. 10 also illustrates embodiments that may include a telescoping portion of the handle 30*b*.

Figure 11A:
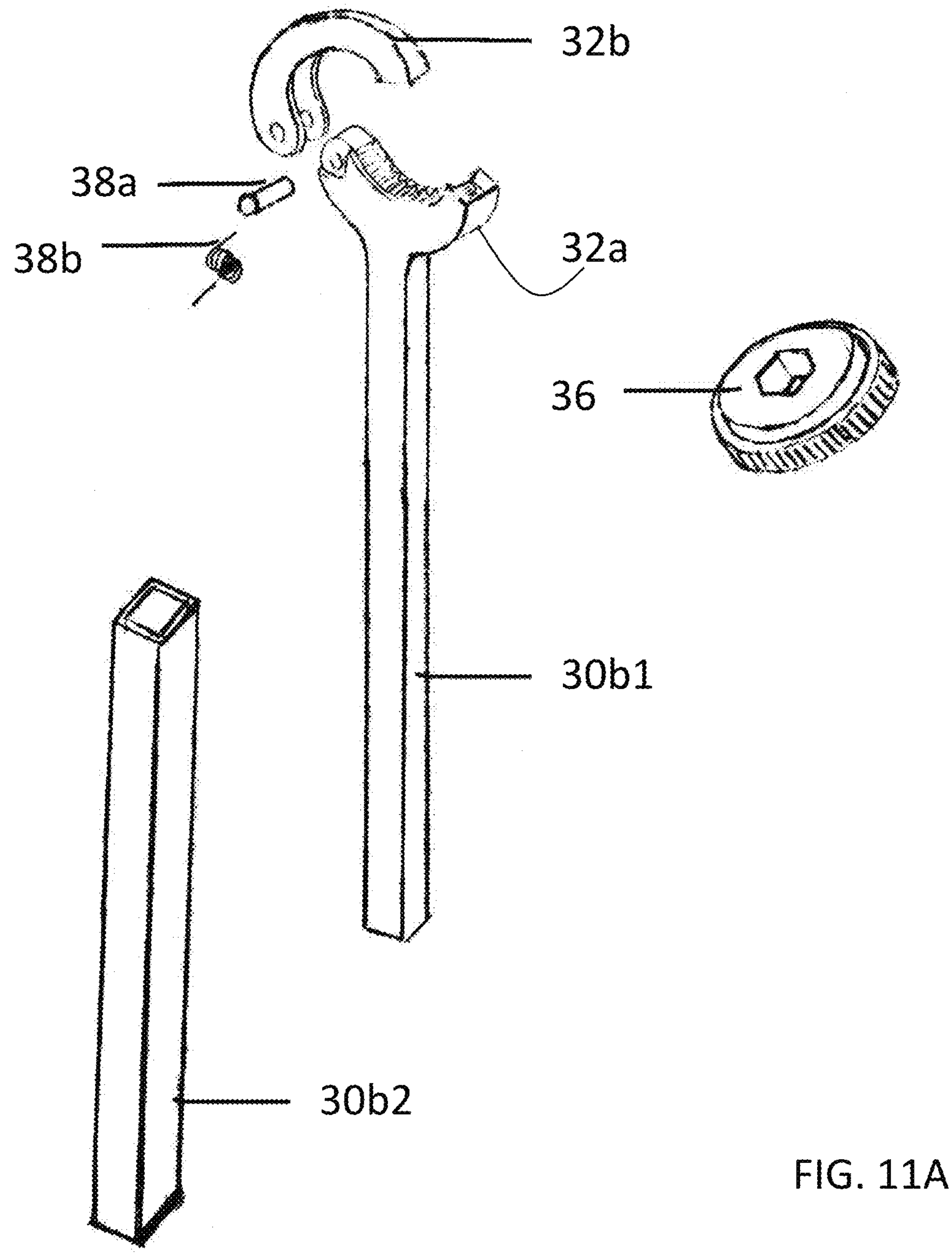
FIGS. 11A & 11B illustrate various exemplary disassembled wrench embodiments, respectively.
Figure 11B:
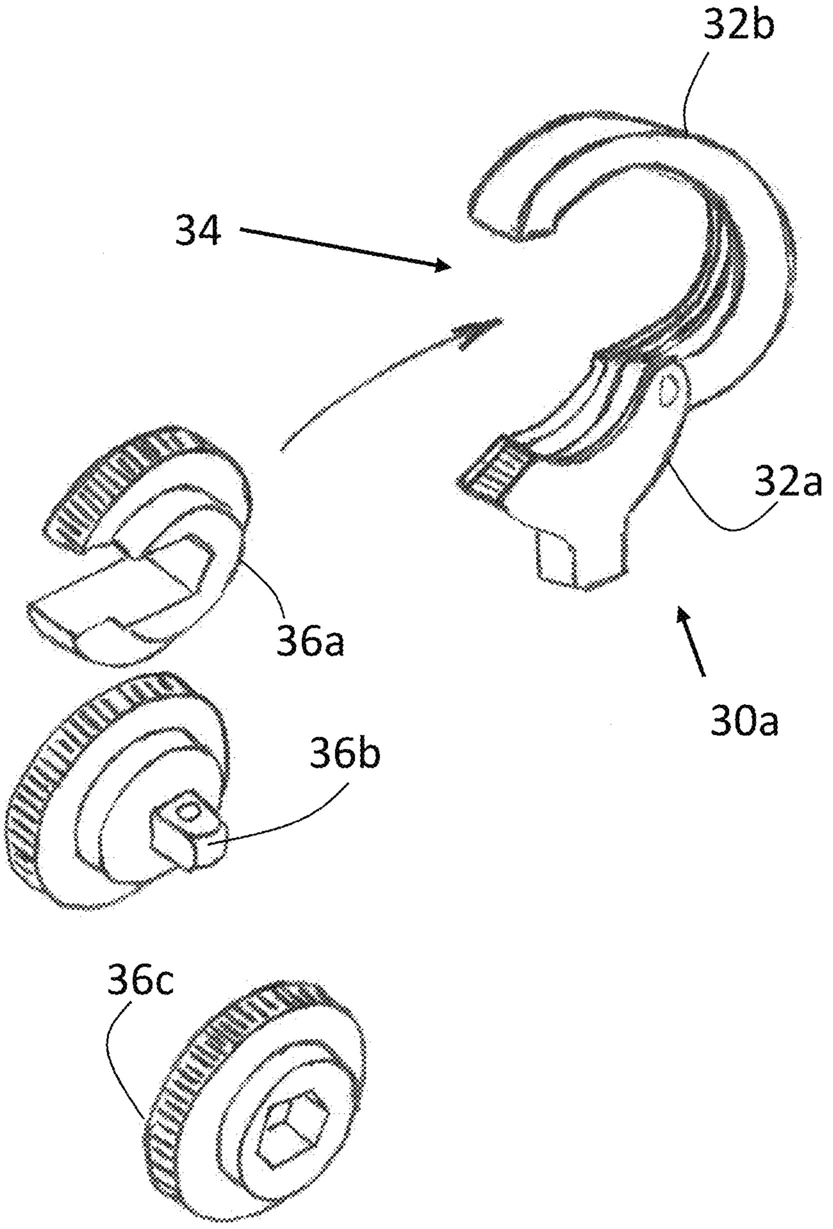

FIGS. 11A & 11B show an exploded view of various wrench embodiments and a close up view of the wrench head 30*a* and gears 36, respectively. As shown in FIG. 11A, the connector 38 may include a pin 38*a* and spring 38*b* to bias the belt 32*b* to close the mouth 34. In addition, the handle portion 30*b* may include multiple portions, such as 30*b*1 and 30*b*2, to facilitate various functions, such as telescoping, and/or provide look and feel characteristics of the tool.

As shown in FIG. 11B, one or more retaining lips may be provided on the belt 32*b*, fixed jaw 32*a*, and/or the gear 36 to restrain movement of the gear 36 out of the plane of rotation when the gear 36 is retained in the mouth 34 of the wrench 30. The various gears 36 shown are exemplary, and not limiting, in nature of the types of toothed gears 36 that may be used in the wrench 30.

Wrench embodiments may be used with a variety of gear types, such as ratcheting open-end, ratcheting flare nut, ratcheting 6-point box-end, ratcheting 12-point box-end, ratcheting spline, conventional socket adapter, and pass-thru socket. While the gear 36 has been generally described relative to tightening and/or loosening fittings of all sorts, it will be appreciated that the gear 36 may provide other functionality as is commonly found in ratchet and driver sets. FIG. 11B includes three exemplary type of gears 36 that may be used with toothed or toothless ratchet engagement mechanisms. Gear 36*a* is a standard open-end gear that engages a fitting of a particular size and shape. Gear 36*b* is a socket adapter that engages standard sockets, which are used to engage fittings of various sizes and shapes. Gear 36*c* is a standard closed-end, or box, gear that engages a fitting of a particular size and shape.

Figures 12, 13:
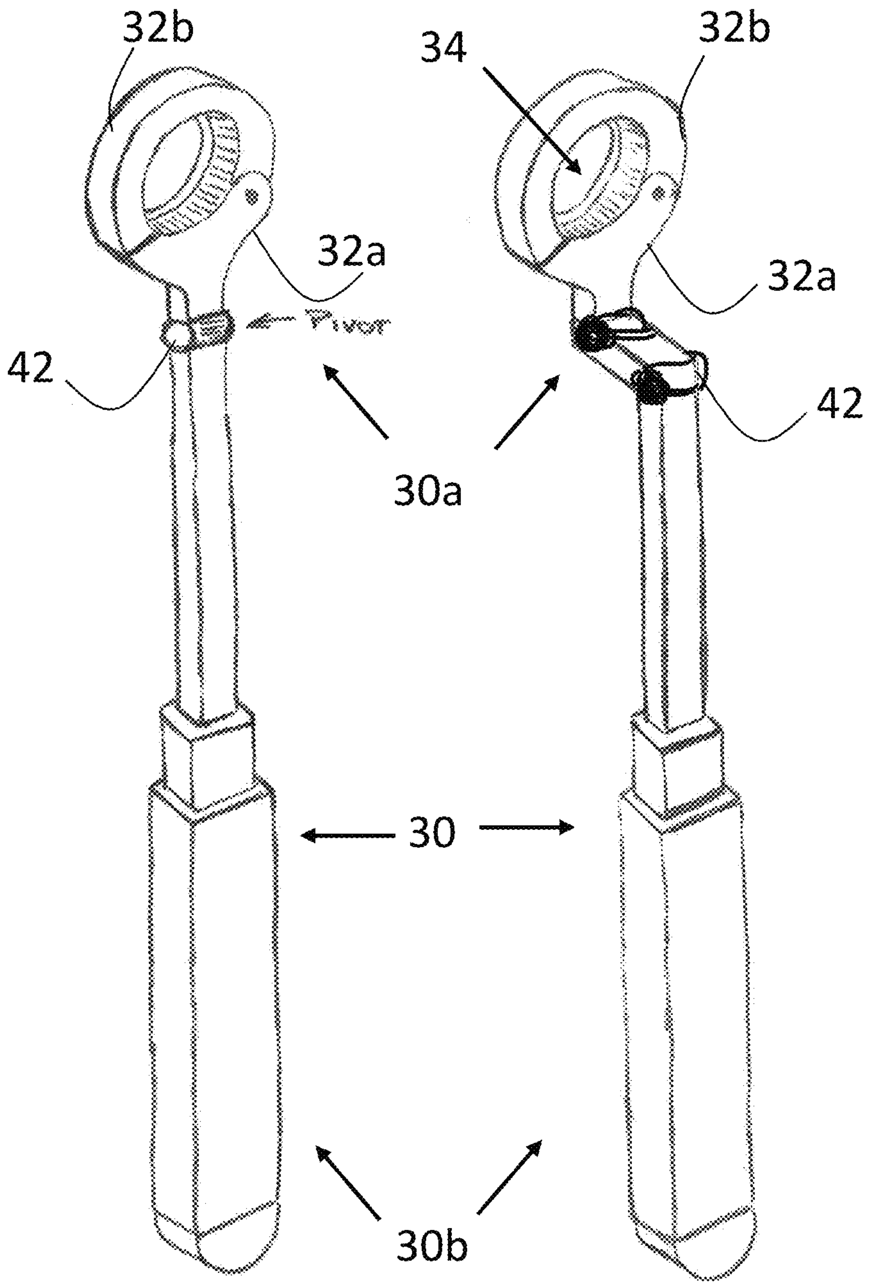
FIGS. 12-14 illustrate various exemplary wrench embodiments, respectively.

FIGS. 12 and 13 illustrate various embodiments in which the wrench head 30*a* and handle 30*b* are not coplanar. The wrench 30 may be provided with one or more joints 42, such as a pivot, to allow the wrench handle 30*b* to be repositioned, e.g., pivoted, relative to the wrench head 30*a*.

The mouth 34 may include one or more ratchet, or ratcheting, mechanisms, such as fixed teeth as noted above, one or more biased pawl mechanisms, and various other mechanisms, such as those described in U.S. Pat. No. 6,044,944, which is incorporated herein by reference.

Figure 14:
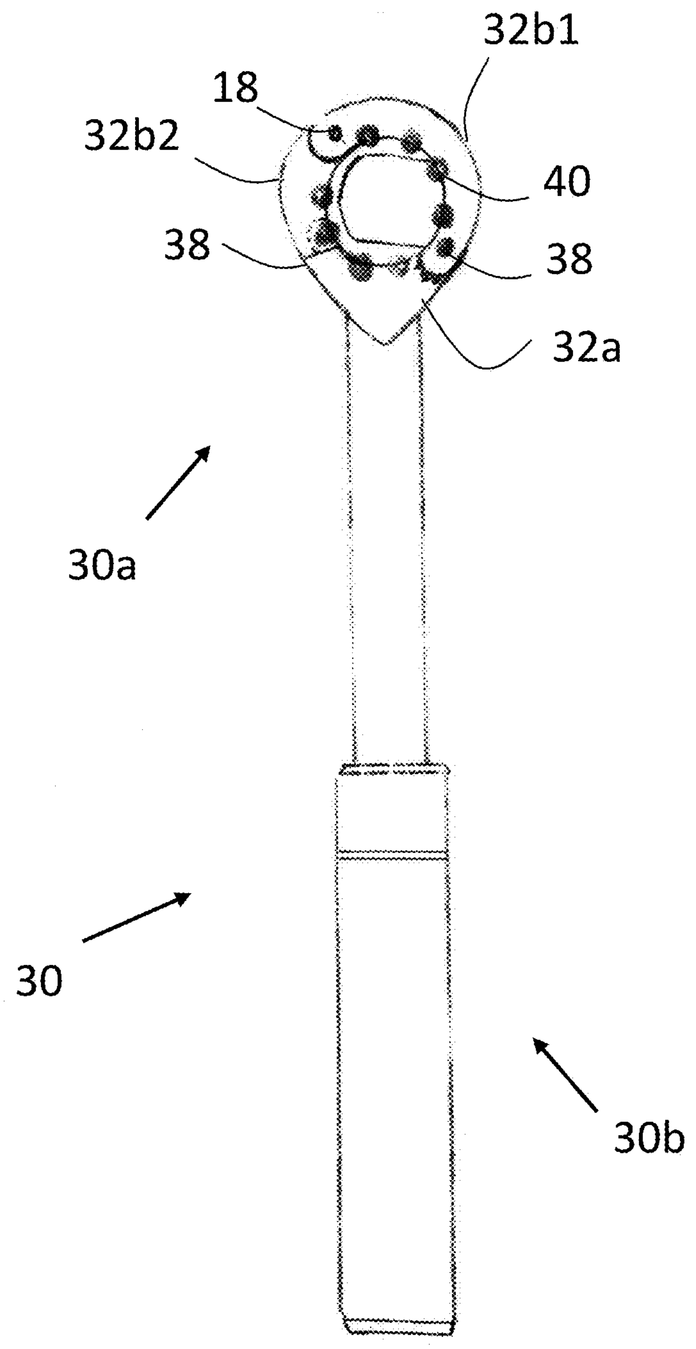

FIG. 14 illustrates various embodiments that employ a multi-sectioned belt 32*b*, in which the belt 32*b* includes a 1st belt section 32*b*1 may be connected to the fixed jaw 32*a* as described in various single section belt embodiments, and one or more additional sections connected to the 1st belt section 32*b*1, such as 2nd belt section 32*b*2, which may be connected to the 1st belt section 32*b*1 by one or more connectors 38 that may employ the same or different connection mechanism as may be used to connect the 1st belt section 32*b*1 to the fixed jaw 32*a*. As described above regarding the belt 32*b* connection, the belt section connections 38 may be biased, locking, free moving and may cooperate with the fixed jaw 32*a,* such as via a lip 39 cooperating with a recess in the fixed jaw 32*a*.

The various embodiments may include one or more bearings 40 in the perimeter defining the mouth 34 to enable engagement of the toothed and/or toothless gears 36. The bearing 40 may be configured to rotate freely in the disengaged rotational direction and lock in place when force is applied in the engaged direction.

Figure 15:
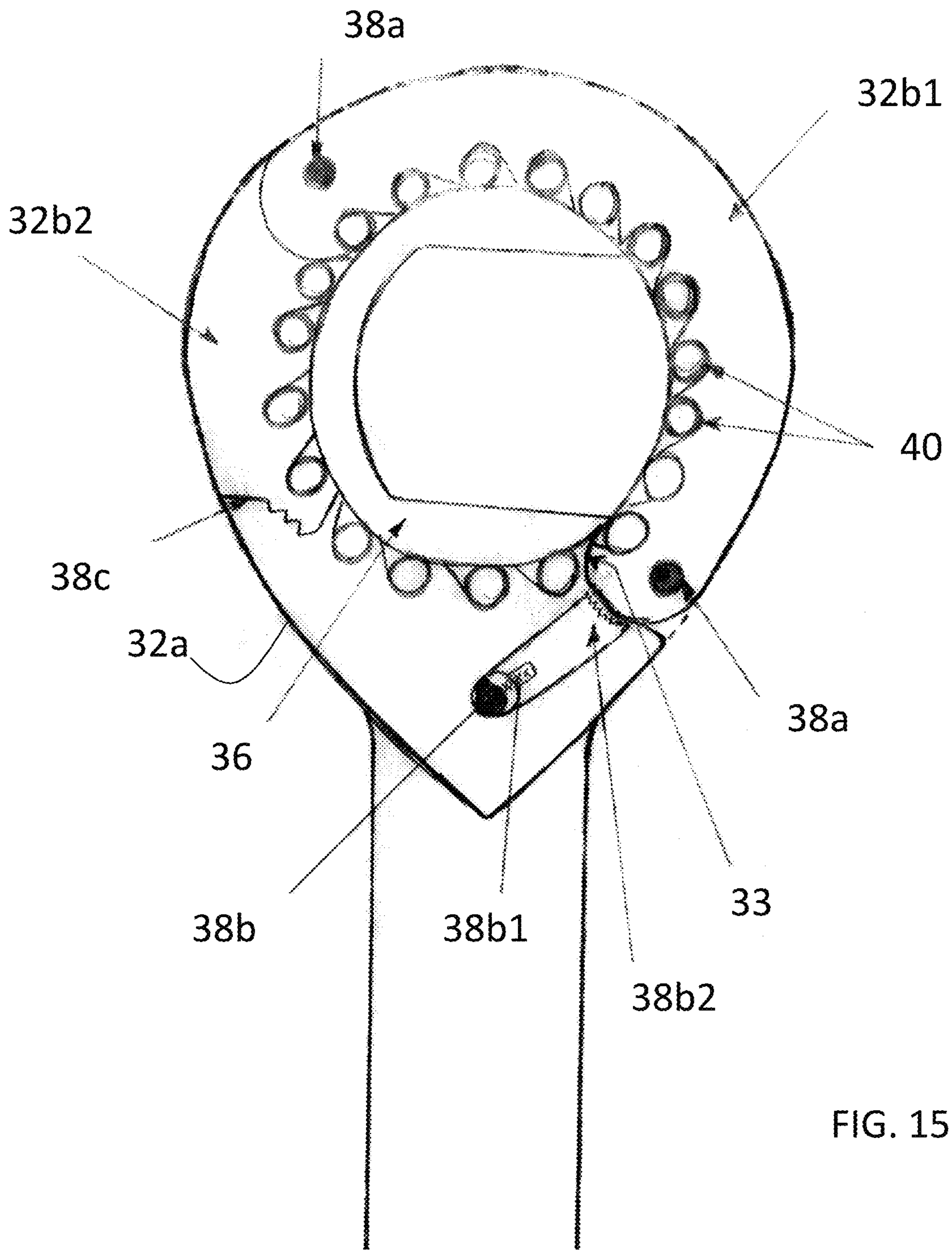
FIG. 15 illustrates a close-up plan view of various wrench head embodiments.

FIG. 15 illustrates a close-up plan view of various wrench head 30*a* embodiments. The wrench head 30*a* may include a fixed jaw 32*a* and one or more portions and multiple belt sections, e.g., 32*b*1, 32*b*2, etc., connected by the connectors 38. The fixed jaw 32*a* may include an integrated and separate belt stop 33 to prevent rotation of the belt 32*b* beyond a point.

In various embodiments, the connectors 38 may be embodied as eccentric hinge 38*a* with a biased locking mechanism 38*b,* such as a spring 38*b*1 to bias an engagement member 38*b*2 into cooperation with the belt 32*b* to maintain the belt 32*b* in one or more closed and/or open positions. Eccentric hinges 38*a* may also be employed as connectors 38 for the other belt sections 32*bn*, where n is the number of belt sections (n=2 in FIG. 15). A latch or locking connection 38*c* may be employed as the connector 38 for the last belt section 32*bn* that connects to the fixed jaw 32*a* in closed configurations.

The connector 38 connecting the fixed jaw 32*a* to the belt 32*b* may be also provided include a slide portion, in addition to enabling pivoting of the belt 32*b*. In that manner, the belt 32*b* may be closed to retain the gear 36 for operation, but the sliding function of the connector 38 enables the jaws 32 to clamp down on the gear 36 when the wrench is rotated in the direction to engage the gear 36 and slides to an extent when the wrench 30 is rotated in the other direction to allow or support the free rotation of the jaws 32 and/or the disengagement of the last belt section 32*bn* from the fixed jaw 32*a*. One of skill in the art will appreciate that the amount of slide provided in the connector 38 may be a function of the various aspects of the wrench 30 design, such as the ratcheting mechanism selection, the jaws 32 and types of connections between the belt 32*b* and the fixed 32*a*.

In various embodiments, the last belt section 32*bn* may serve as a gate that may be open and closed independently or in combination with the other belt sections. The gate function allows for the gear 36 that is open-ended to be installed and retained in the mouth 34 and then engaged with the fitting, followed by closing the gate, as further described below. The gate may or may not connect to the fixed jaw 32*a*.

In operation, the gear 36 is selected to perform a desired task, such as loosening or tightening a fitting. If a closed end gear can not be placed over the fitting, such as fittings on brake lines and other lines, an open-ended gear suitable for the fitting may be placed into engagement with the fitting. Then the belt 32*b* on the wrench 30 is moved to open the mouth 34 and the belt 32*b* and fixed 32*a* are positioned, so the gear 36 is received in the mouth 34 of the wrench 30. The belt 32*b* is then returned to its operational position, which may partially or completely enclose the gear 36. The wrench 30 is then used to perform the desired operation.

As described above, in various closed or nearly closed belt embodiments with multiple belt sections, the open-end gear 36 may be inserted into the mouth 34 of the wrench 30 before the fitting is engaged with the gear 36. In this procedure, the belt 32*b* is opened to allow the insertion of the open-end gear 36. The belt 32*b* is then closed to retain the gear 36 with the open end facing the last section of the belt 32*bn*, or gate, that latches to the fixed jaw 32*a*. The gate is opened and the retained gear 36 is engaged with the fitting. The gate may be closed and the wrench 30 may be used to perform the desired operation on the fitting.

Figure 16:
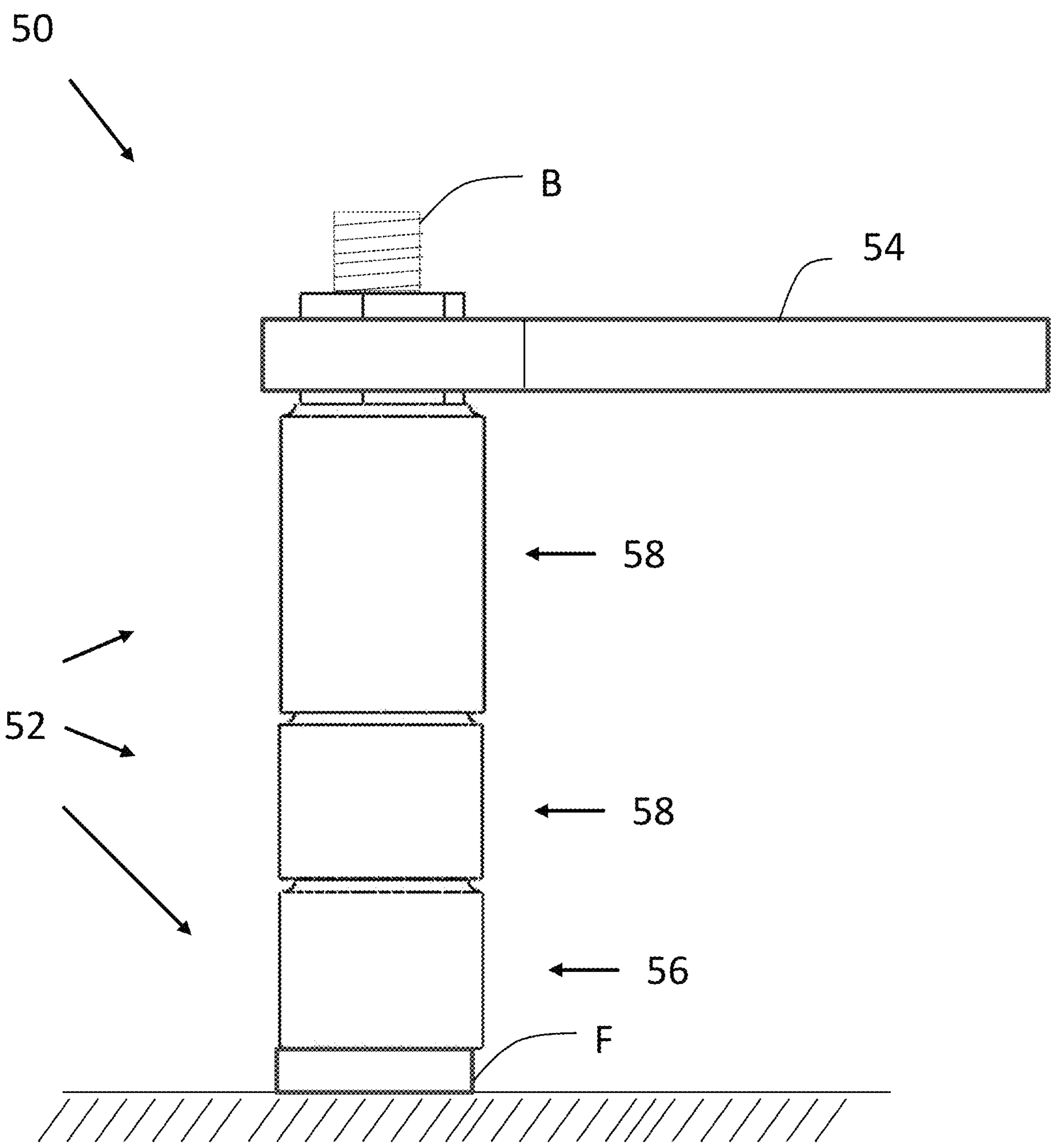
FIG. 16 illustrates a side view of exemplary embodiments of the stackable socket system.

As shown in FIG. 16, socket systems 50 may generally include two or more stackable sockets 52 and an open ended or closed ended force applicator, or socket driver, 54, such as a wrench, drill, or other manual or motorized tool used to apply linear and/or rotational (torque) force to a socket to tighten or loosen fittings F on a bolt B. In FIG. 16, the bolt B is shown in dashed lines to indicate that in some embodiments, the sockets 52 may be designed and stacked such that the bolt B may extend through a tubular portion defined by the interior of one or more or all of the stacked sockets 52.

The sockets 52 may include one or more first sets of sockets, or first sockets, 56 and one or more second set of sockets, or second sockets, 58. Each of the sockets 52, including first sockets 56 and second sockets 58, may have a first end 60 and a second end 70. The first end 60 of the first socket 56 may have an inner surface 62 of a size and shape that may be used to engage a fitting F, e.g., ½ inch, hex, 10 mm spline, etc. The second end 70 of both the first sockets 56 and second sockets 58 may have an outer surface 72 of the same size and shape, e.g., 1 inch, hex, 15 mm spline, etc. The first end 60 of the second sockets 58 may have an inner surface 63 of a size and shape to correspondingly receive and engage the outer surface 72 of the first sockets 56 and other second sockets 58, as well as fittings F that have the same size and shape.

Figure 17A:
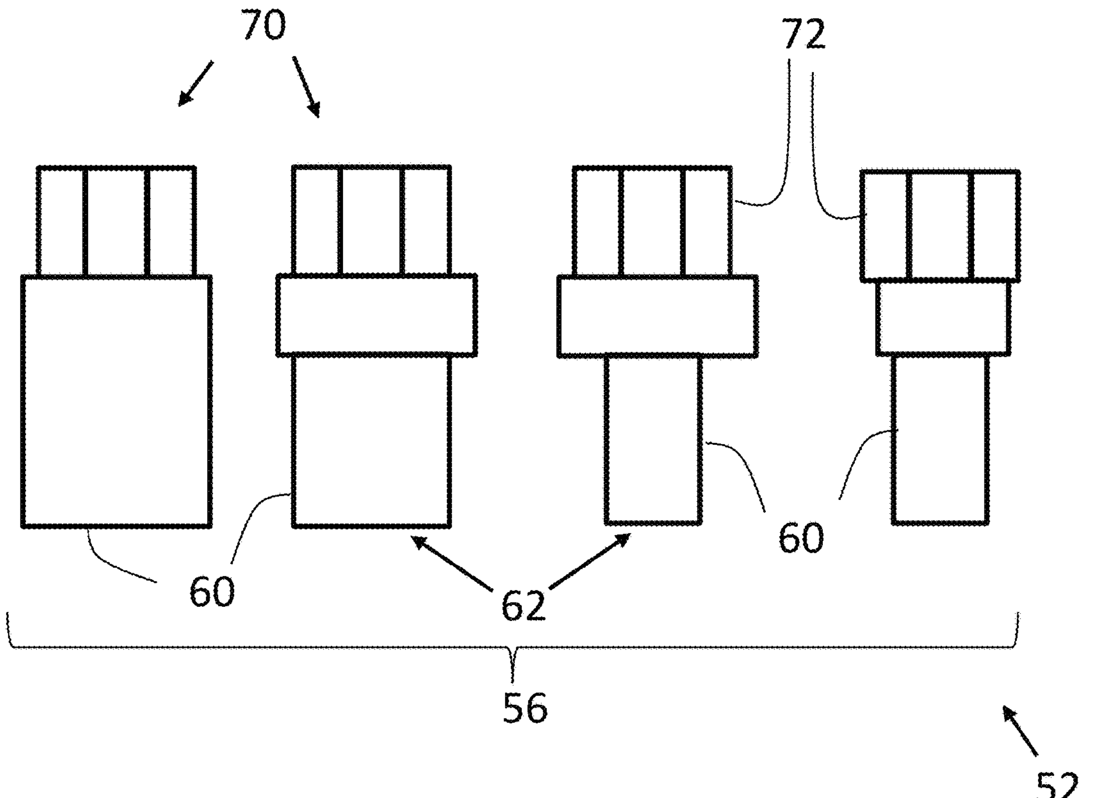
FIGS. 17A & 17B illustrate various side views of exemplary sockets of a first set of socket embodiments.
Figure 18A:
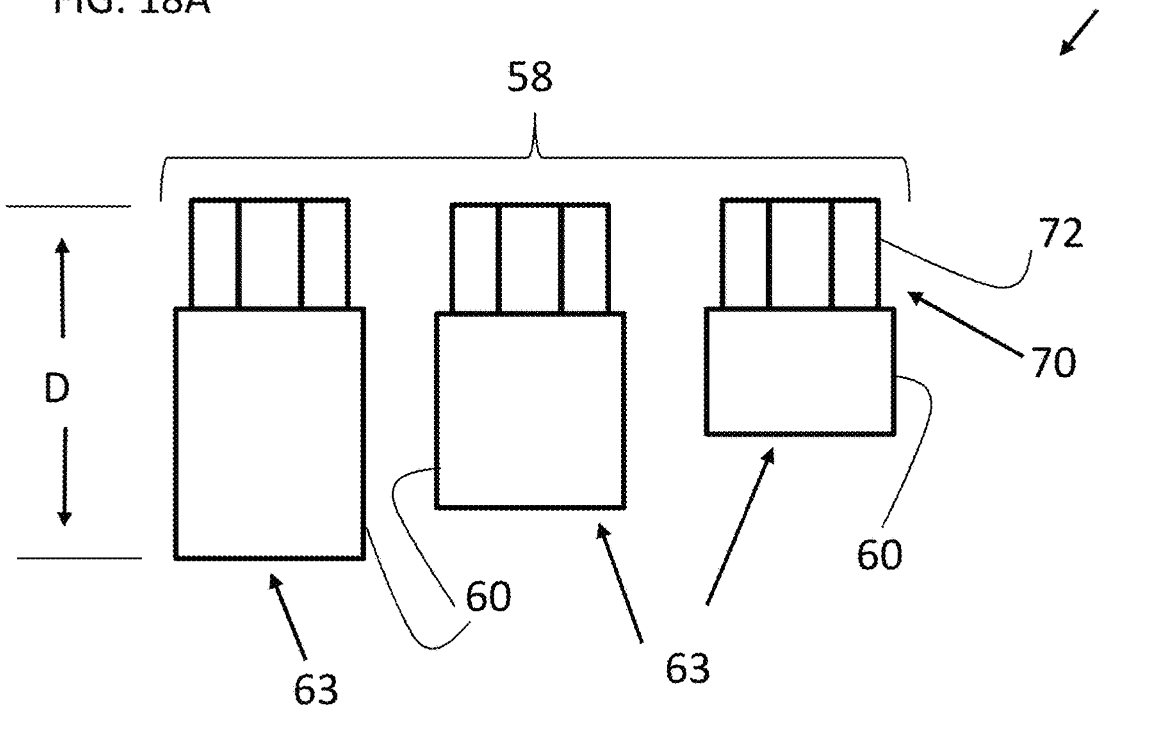
FIGS. 18A & 18B illustrate various side views of exemplary sockets of a second set of socket embodiments.
Figure 17B:
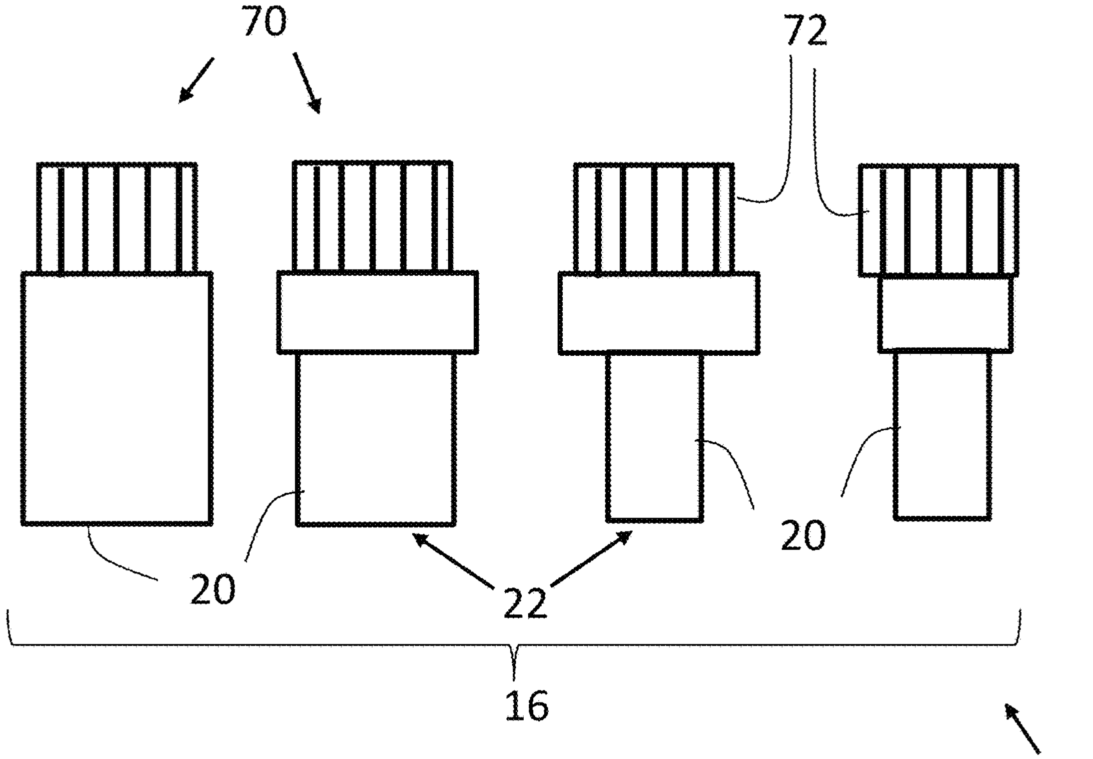
Figure 18B:
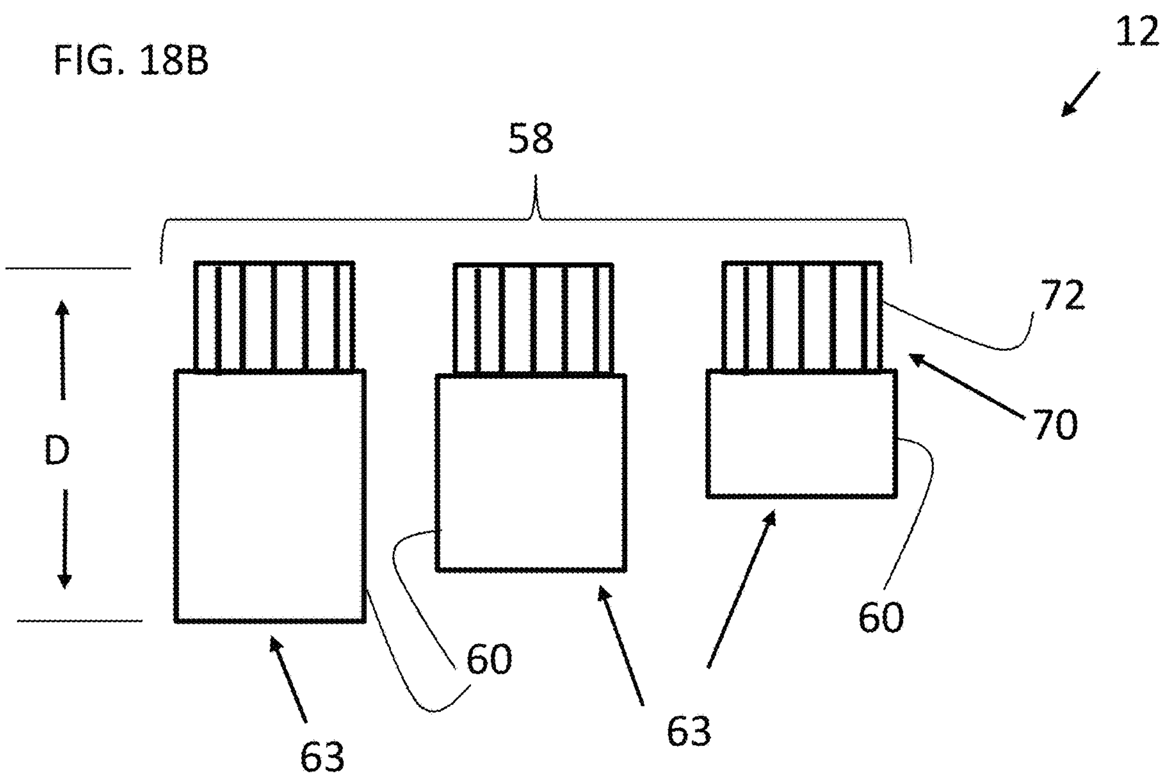

FIGS. 17A and 18A illustrate various exemplary embodiments of sockets 52 that may be provided as first socket 56 and second sockets 58 with hex outer surfaces 72. FIGS. 17B and 18B illustrate various exemplary embodiments of sockets 52 that may be provided as first socket 56 and second sockets 58 with spline outer surface 72. It will be appreciated that the inner surface 62/63 may or may not be the same shape or size as the outer surface 72. The sockets 52 may be constructed from various materials, e.g., steel, etc., as desired by one of ordinary skill for various applications.

Sockets 52 are generally tubular in shape to allow a bolt B associated with the fitting F to partially or fully pass through the interior of the sockets 52. The sockets 52 may also be described as having a first, or female, end 60 with inner diameter 62 sized to receive the fitting F and associated bolt extending through fitting F and translate force applied to the socket 52 to the fitting F. The socket 52 may have a second, or male, end 70 with the outer surface 72 sized and shaped for force application to the socket by the socket driver 54 that is translated via the socket 52 through the first end 60 to the fitting F engaged by the socket 52.

One or more of the sockets 52 may have the same or different depths D as desired by the skilled artisan. For example, in various embodiment, the first sockets 56 may have the same depth D, while the second sockets 58 may have different depths D, such that the second sockets 58 may be used in various combinations to vary the effective depth of the first socket 56 used to engage the fitting F. In other embodiments, some or all of the first sockets 56 may have different depths D and/or some or all of the second sockets 58 may have the same depths D, as desired.

Figure 19:
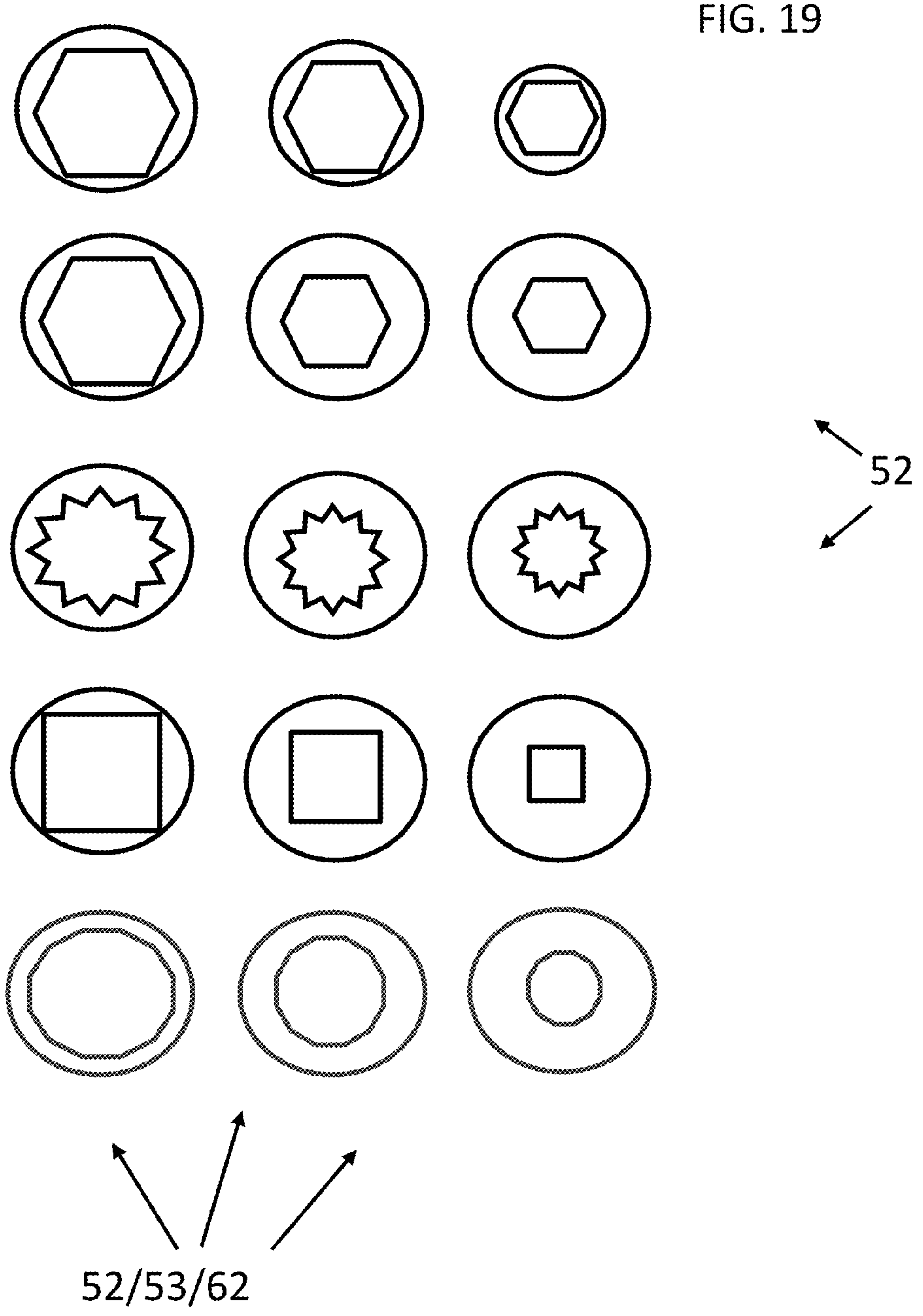
FIG. 19 illustrates various top and bottom views of exemplary socket embodiments.
Figure 20:
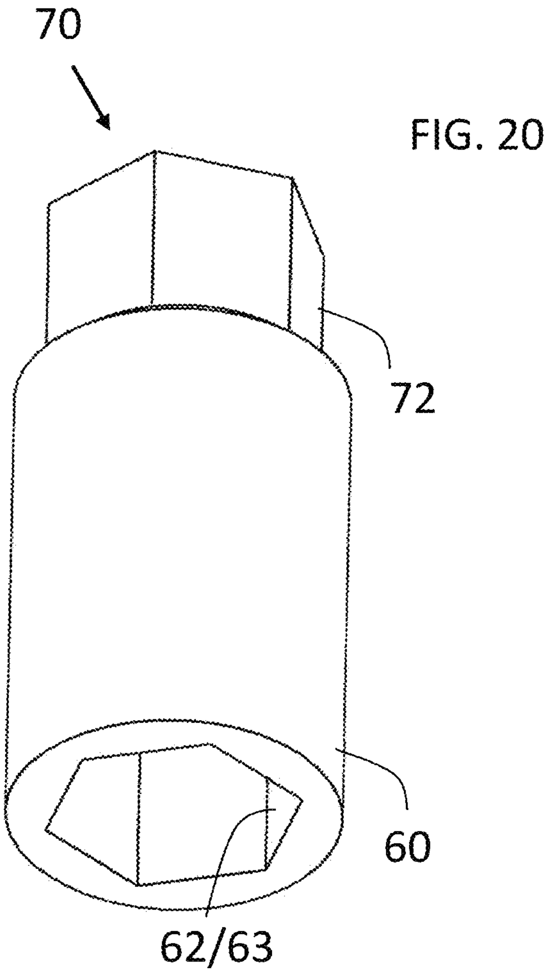
Figure 21:
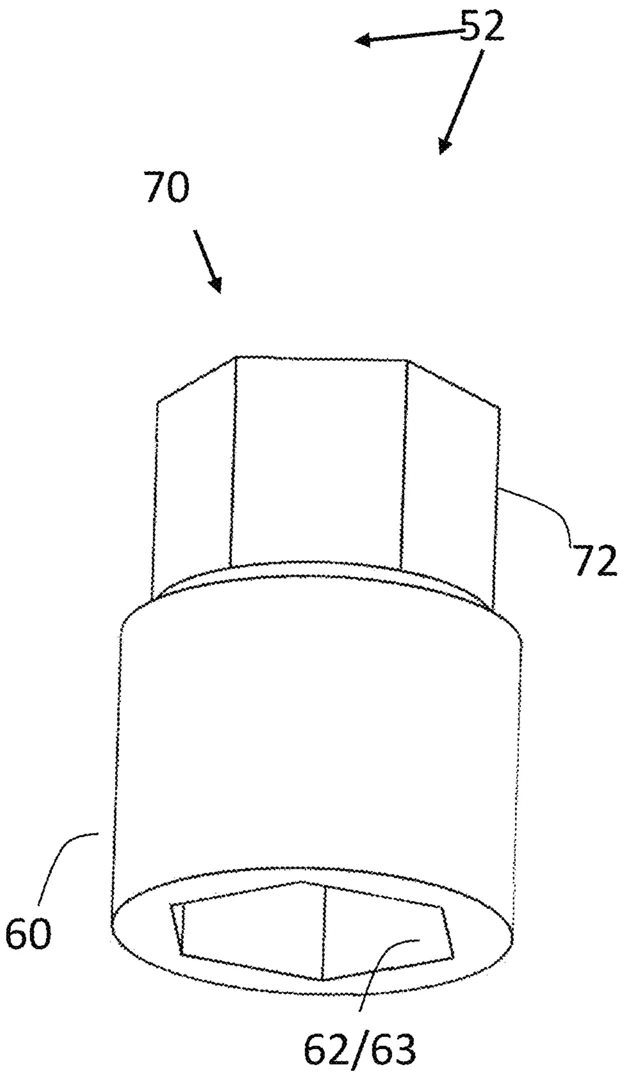

FIG. 19 shows various exemplary size and shapes for the inner surfaces 62 and 63 and the outer surface 72. As described above, the outer surface 72 of the first and second sockets 56 and 58, respectively, are sized and shaped to be engaged by the inner surface 63 of the second socket 58. In this manner, one or more sockets 58 may be stacked upon the first socket 56 to effectively extend the depth of the socket and enable the socket driver 54 to engage the socket at various distances from the fitting F. It will be appreciated that in some instances, there may be one or more first sockets 56 that have an inner surface 62 sized and shaped to engage the outer surface 72 of other first sockets 56 and second sockets 58.

FIGS. 20-23 show exemplary perspective view of sockets 52 of different sizes, shapes, and depths D showing the inner surface 62 and 63 of sockets 52 that may be employed as first sockets 56 or second sockets 58. It will be appreciated that there may be multiple set of first sockets 56 and second sockets 58 that cover a wide range of shapes, size, and depth of sockets required for various applications. For example, one of the sets of second sockets 58 may have its inner surface 63 and outer surface 72 sized and shaped for 5 mm, which is used with a set of first sockets 56 that have inner surfaces 62 sized for use with fittings F ranging from 1-50 mm. Similarly, another set of second sockets 58 may be designed for use with a set of first sockets 56 having inner surfaces designed for hex shaped fittings F ranging from ¼ inch to 1 inch hex fittings with outer surfaces 72 on at second ends 70 with a 1 inch hex shape and a depth of 1 inch with the second sockets 58 having the first and second ends sized at 1 inch hex, but various depths. The skilled artisan may be able to envision an incredibly large number of pairs of first and second sets of sockets spanning a wide or narrow range of size and shapes and numerous applications.

Figure 24:
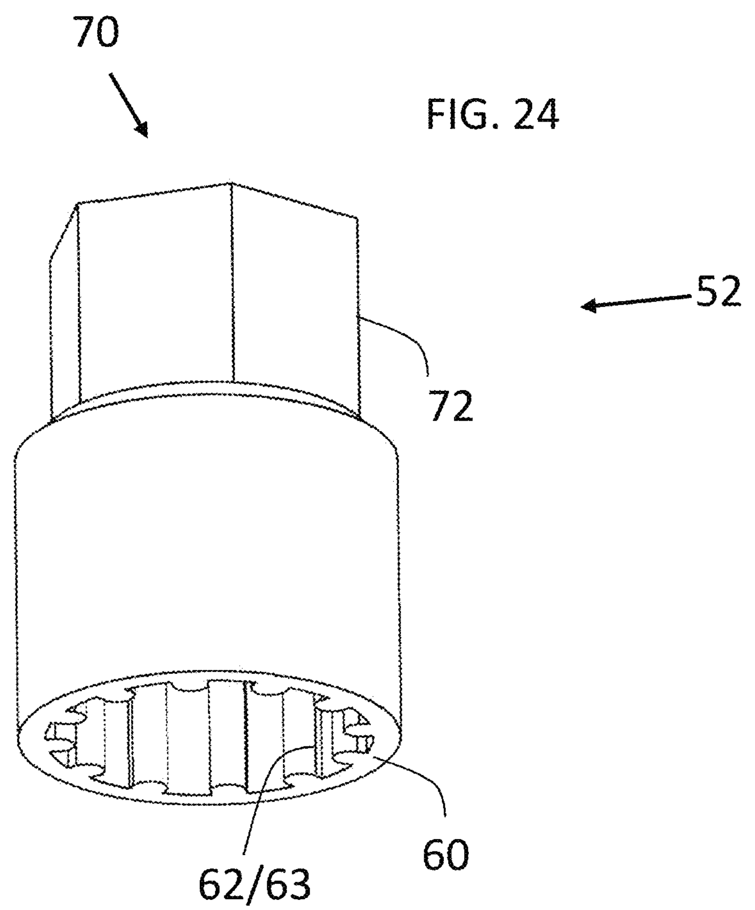

FIG. 24 shows an exemplary perspective view of sockets 52 that have inner surface 62 or 63 that are different in shape than the outer surface 72. While FIG. 24 depicts a spline-shaped inner surface 62 or 63 with a hex-shaped outer surface 72, it will be appreciated that those shapes could be interchanged and other shapes may be employed as well. These individual sockets 52 may be used as adaptors to enable stacking with multiple sets of first and second set sockets 56 and 58. In addition, these individual sockets 52 may be used as adapters to adapt a second end of prior art standard and custom sockets to sizes and shapes compatible with sockets 52 of the present invention.

In various system 50 embodiments, for a range of fitting sizes, e.g. 1-2 inches, one set of second sockets 58 may be employed with multiple set of first sockets 56. Each set of first sockets 56 may have a different inner surface 62 shape, e.g., hex, spline, etc., but may have the same outer surface 72 shape, e.g., hex, which corresponds the inner surface 63 and outer surface 72 of the second socket 58 set. In this manner, a single set of second sockets 58 may be used to extend the depth of first sockets 56 with inner surfaces 62 designed to engage a wide range of fittings F. In other words, the system 50 may include a plurality of first socket sets. Each of the first socket sets may include one or more first sockets 56 that may have a first end 60 with an inner surface 62 that has one of a common shape and common size and one of a different shape and different size to receive a fitting. For example, each first socket 56 in a first set of first sockets may have a spline-shaped inner surface 62, but different sizes, e.g., 1-10 mm, while a second set may have a hex-shaped inner surface 62, but different sizes, which may or may not include the sizes in the first set.

Each first socket 56 in each set may have the same outer surface 72 size and shape, which corresponds to inner surface 63 and outer surface 72 of the second sockets 58. Consequently, the second sockets 58 may be stacked with any of the first socket sets, which dramatically reduces the number of sockets needed by the user for various applications.

In various embodiments, the sockets 52 may include various standard or custom sockets that do not have inner and/or outer surface sizes and shapes conforming to the first and second sockets 56 and 58. For example, the top socket in the stack, i.e., the socket in the stack of sockets furthest from the fitting F being engaged, may be a standard socket with a first end sized and shaped to the outer surface 72 of the first and second sockets 56 and 58, and the second end 70 having a size and shape adapted to be engaged by various socket drivers 54. Conversely, the standard and custom sockets may be used elsewhere in the socket stack and an adapter socket, such as shown FIG. 24, may be used to enable stacks with custom and standard sockets.

As shown in FIGS. 25-27, the second end 70 may be shaped to enable engagement by multiple types of socket drivers, e.g., wrenches, square-post ratcheting drivers, manual & power drills, etc. Sockets 52 having second ends 70 configured to enable multiple tool engagement provides a user of the system 50 with more options for executing tasks. As shown in FIGS. 26-27, the outer surface 72 may, for example, be a hex, spline, or other shape, suitable for engagement by a wrench, etc. and the second end 70 may include a pass through opening with an inner surface 74 shaped to receive a square-post socket driver or other shaped driver.

In operation, a user may have two or more inventive sockets 52 at their disposal. The user may select a first socket 56 with an inner surface 62 sized and shaped to fit a first fitting F. The user may then select one second socket 581 with the outer surface 72 sized and shaped to fit the second end 70 of the first socket 56, stack the first socket 56 and second socket 58 by engaging the second end 70 of the first socket 56 with the first end 60 of the second socket 58, thereby effectively extending the depth of the socket 56. The user may then stack additional second sockets 58. on the one second socket 581 or may apply force to the second socket 58 with the socket driver 54 that is sized and shaped to engage the second socket 58.

It is to be understood that the above description is intended to be illustrative, and not restrictive. Many other embodiments will be apparent to those skilled in the art, upon reviewing the above description. The scope of the invention should, therefore, be determined with reference to any appended claims, along with the full scope of equivalents to which such claims are entitled.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more", "at least one", etc., unless specified noted. Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The presence or absence of a summary, abstract, or claims in this application should in no way be considered as limiting on the scope of any inventions disclosed herein.

What is claimed is:

1. A ratcheting wrench comprising:

an inner body having an inner mouth configured to retain a gear in cooperation with a ratchet mechanism retained within the inner mouth by retaining rings and an inner handle configured to apply a rotational force to the retained gear; and an outer body separable from and removably attached to the inner body and including an outer mouth configured to retain the inner mouth within the outer mouth, and stabilize, and provide strength to the inner mouth, when force is applied to a fitting via the gear installed in the inner mouth, the outer body including an outer handle to retain the inner handle;

the inner body being spring-loaded into the outer body via a spring positioned and received within the outer handle; and wherein the inner body is retained in the outer body via a spring-button retention assembly.

2. The wrench of claim 1, where the outer mouth is configured prevent spreading of the inner mouth, when force is applied to the fitting via the gear installed in the inner mouth.

3. The wrench of claim 1, where the ratchet mechanism includes at least two pawls biased with a tapered spring on the sides of the inner mouth.

4. The wrench of claim 1, where the the inner handle is disposed within the outer handle.

5. The ratcheting wrench of claim 1, where the inner mouth is open-ended.

6. The ratcheting wrench of claim 1, where the gear is one of ratcheting open-end gear, ratcheting flare nut gear, ratcheting 6-point box-end gear, ratcheting 12-point box-end gear, ratcheting spline gear, conventional socket adapter gear, and pass-thru socket gear.

7. The ratcheting wrench of claim 1, where the outer handle is an extendable handle.

8. The ratcheting wrench of claim 1, where the outer mouth and outer handle are integrally connected.

* * * * *